United States Patent
Nishimoto et al.

(10) Patent No.: US 11,248,297 B2
(45) Date of Patent: Feb. 15, 2022

(54) AUSTENITIC HEAT RESISTANT ALLOY AND METHOD FOR PRODUCING SAME, AND AUSTENITIC HEAT-RESISTANT ALLOY MATERIAL

(71) Applicant: NIPPON STEEL CORPORATION, Tokyo (JP)

(72) Inventors: Takumi Nishimoto, Tokyo (JP); Yoshitaka Nishiyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/959,292

(22) PCT Filed: Jan. 8, 2019

(86) PCT No.: PCT/JP2019/000164
§ 371 (c)(1),
(2) Date: Jun. 30, 2020

(87) PCT Pub. No.: WO2019/138987
PCT Pub. Date: Jul. 18, 2019

(65) Prior Publication Data
US 2021/0054509 A1    Feb. 25, 2021

(30) Foreign Application Priority Data

Jan. 10, 2018  (JP) .............................. JP2018-001711

(51) Int. Cl.
| | | |
|---|---|---|
| C23C 22/34 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/44 | (2006.01) | |
| C22C 38/48 | (2006.01) | |
| C22C 38/50 | (2006.01) | |
| C22C 38/54 | (2006.01) | |
| C22C 38/58 | (2006.01) | |
| C22C 38/52 | (2006.01) | |
| C23C 22/78 | (2006.01) | |

(52) U.S. Cl.
CPC ............ *C23C 22/34* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *C22C 38/52* (2013.01); *C22C 38/54* (2013.01); *C22C 38/58* (2013.01); *C23C 22/78* (2013.01)

(58) Field of Classification Search
CPC ..... C23C 22/34; C22C 38/001; C22C 38/002; C22C 38/02; C22C 38/04; C22C 38/06; C22C 38/44; C22C 38/48; C22C 38/50; C22C 38/54; C22C 38/58
USPC ....................................................... 428/472.2
See application file for complete search history.

(56) References Cited

U.S. PATENT DOCUMENTS

| | | | |
|---|---|---|---|
| 3,969,153 A | 7/1976 | Suzuki et al. | |
| 2004/0206427 A1 | 10/2004 | Iseda et al. | |
| 2013/0244866 A1 | 9/2013 | Najbar et al. | |

FOREIGN PATENT DOCUMENTS

| | | | | |
|---|---|---|---|---|
| CA | 3052547 A1 | 8/2018 | | |
| CN | 1519388 A | 8/2004 | | |
| EP | 2781612 A1 * | 9/2014 | ........... | C22C 19/055 |
| EP | 2781612 A1 | 9/2014 | | |
| JP | 64068449 A | 3/1989 | | |
| JP | 08041595 A | 2/1996 | | |
| JP | 2013104109 A | 5/2013 | | |
| JP | 2013199663 A | 10/2013 | | |
| JP | 2016037664 A * | 3/2016 | | |
| JP | 2016050328 A | 4/2016 | | |
| JP | 2017206717 A | 11/2017 | | |

OTHER PUBLICATIONS

Hamaguchi et al., JP 2016037664 A machine translation, Mar. 22, 2016, entire machine translation (Year: 2016).*
Francis, The Relationship between Lattice Parameter and Chemical Constitution of Spinel Oxide Phases formed during the oxidation of austenitic steels, J. appl. Chem., 1966, vol. 16 Sept., URL: <https://onlinelibrary.wiley.com/doi/pdf/10.1002/jctb.5010160903>, pp. 264-265 (Year: 1966).*
ISR issued in Int'l. Application No. PCT/JP2019/000164, dated Feb. 19, 2019.
V.A. Kurepin, et al., "Thermodynamic Modelling of Fe—Cr—Ni-Spinel Formation at the Light-Water Reactor Conditions" Mar. 2002, Paul Scherrer Institut, Villigen, CH, pp. 20-60.

* cited by examiner

*Primary Examiner* — Humera N. Sheikh
*Assistant Examiner* — Katherine A Christy
(74) *Attorney, Agent, or Firm* — Greer, Burns & Crain, Ltd.

(57) ABSTRACT

Provided are an austenitic heat resistant alloy capable of exhibiting sufficient molten-salt corrosion resistance even when exposed to a molten salt of 600° C. and a production method thereof, and an austenitic heat-resistant alloy material. An austenitic heat resistant alloy includes a base metal, and a Ni—Fe oxide having a spinel structure on or above the surface of the base metal. The base metal has a chemical composition consisting of, in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Mo: less than 0.5%, Co: 0 to 0.80%, and Cu: 0 to 0.50%, with the balance being Fe and impurities.

10 Claims, No Drawings

AUSTENITIC HEAT RESISTANT ALLOY AND METHOD FOR PRODUCING SAME, AND AUSTENITIC HEAT-RESISTANT ALLOY MATERIAL

This is a National Phase Application filed under 35 U.S.C. § 371, of International Application No. PCT/JP2019/000164, filed Jan. 8, 2019, the contents of which are incorporated by reference.

TECHNICAL FIELD

The present disclosure relates to an austenitic heat resistant alloy and a production method thereof, and an austenitic heat-resistant alloy material.

BACKGROUND ART

Recently, for the purpose of energy saving, the development of high efficiency boilers has been underway. For example, an ultra-supercritical boiler utilizes increased temperature and pressure of the steam than before for increased energy efficiency. For example, as a heat resistant alloy pipe for high-efficiency boilers, a seamless austenitic heat-resistant alloy pipe according to Japanese Patent Application Publication No. 2013-104109 (Patent Literature 1) is proposed. Further, boilers which utilize waste matter and biomass as a fuel other than fossil fuel have being developed. In addition, power generation boilers utilizing solar heat have been developed. In particular, solar power generation boilers have gained attention from the viewpoint of energy saving and environmental preservation.

In concentrating solar power generation which is common as solar power generation, sunlight is concentrated and converted to heat. Steam is generated by the heat obtained by converting sunlight, and a turbine is rotated by the steam to generate power. A configuration of a concentrating solar power generation system can be broadly divided into a light concentration/heat collection apparatus and a power generation apparatus. Examples of currently used light concentration/heat collection apparatus include a parabolic trough type, a linear Fresnel type, a tower type, and a dish type.

Heat medium such as oil has been used in a heat-transfer pipe of a conventional power generation boiler. However, as the efficiency and temperature thereof increase in recent years, a light concentration/heat collection apparatus for solar power generation may use a molten salt, such as a molten nitrate salt, molten carbonate salt, molten sulfate salt, and molten chloride salt as the heating medium. Moreover, the temperature inside a heat-transfer pipe, etc., of the light concentration/heat collection apparatus for solar power generation rises to about 600° C. Therefore, a heat resistant steel to be used for the heat-transfer pipe, etc., of the light concentration/heat collection apparatus for solar power generation is required to have corrosion resistance in a high-temperature molten salt, in addition to high-temperature strength.

Japanese Patent Application Publication No. 2013-199663 (Patent Literature 2) proposes an austenitic stainless steel having excellent molten nitrate corrosion resistance, comprising, in mass %, C: 0.1% or less, Si: 0.3% or more to 2.0% or less, Mn: 4.0% or less, Ni: 7% or more to 15% or less, Cr: 10% or more to 25% or less, Mo: 2.5% or less, Cu: 3.0% or less, V: 0.5% or less, and N: 0.3% or less, while satisfying 0.5≤Si+0.5 (Mo+Cu)≤2.0%, with the balance being Fe and unavoidable impurities, wherein a proportion of elements other than oxygen that constitute oxides formed in a portion in contact with molten nitrate salt of not more than 600° C. satisfies, in atomic %, Si+0.5 (Mo+Cu)≤20%. Patent Literature 2 states that as a result of this, an austenitic stainless steel which is suitable for use in an area to be in contact with molten nitrate salt in a temperature range of 400 to 600° C. can be obtained.

Japanese Patent Application Publication No. 1-68449 (Patent Literature 3) proposes a molten-salt corrosion resistant material made of an alloy containing Fe, Cr, and Ni, wherein supposing the compositions of Fe, Cr, and Ni, expressed in weight % being as $C_{Fe}$, $C_{Cr}$ and $C_{Ni}$, a value of K defined as $K=C_{Fe} \times C_{Cr}+0.2 \times C_{Ni}^2$ is in a range of 1400 to 1800. Patent Literature 3 states that as a result of this, a molten-salt corrosion resistant material made of an alloy which spontaneously forms a film of Li-complex oxide having excellent corrosion resistance and becomes self-passivated under operating conditions of a molten-carbonate type fuel cell.

Japanese Patent Application Publication No. 8-41595 (Patent Literature 4) proposes a Fe—Cr—Ni based alloy steel having excellent corrosion resistance in a molten salt containing chloride, the Fe—Cr—Ni based alloy steel comprising: in weight %, C: 0.04% or less, Si: 0.5% or less, Mn: 1.5% or less, Cr: more than 18% to less than 30%, Ni: more than 10% to less than 35%, and Ca+Mg: 0.0005 to 0.005%, wherein a ratio of the Cr content to the Fe content (Cr/Fe) is more than 0.33 to less than 0.7, and a ratio of the Ni content to the Fe content (Ni/Fe) is more than 0.33 to less than 1.0. Patent Literature 4 states that as a result of this, a Fe—Cr—Ni based alloy steel having a low price and excellent corrosion resistance in a molten salt containing chloride can be provided.

Japanese Patent Application Publication No. 2016-50328 (Patent Literature 5) proposes a tube member for solar heat collection tube of a solar heat collection tube for heating a heat medium by collecting solar heat into the heat medium flowing inside, the tube member for solar heat collection tube being produced by centrifugal casting; consisting of basic elements consisting of carbon (C), silicon (Si), chromium (Cr), nickel (Ni), manganese (Mn) and copper (Cu), with the balance being iron (Fe) and unavoidable impurities, and trace modifying elements of not more than 1 mass % when the whole cast iron is 100 mass %; and being structured by a matrix composed of an Fe alloy having an austenite phase as the main phase in a room temperature range, wherein a high-nickel layer is formed on an inner surface of a tubular main body formed of a low-nickel heat resistant cast iron including 7 to 22 mass % of nickel (Ni) when the whole cast iron is 100 mass %. Patent Literature 5 states that as a result of this, when a molten salt is used as a heat medium, it is possible to provide a tube member for solar heat collection tube capable of preventing corrosion even when the molten salt becomes a high-temperature state more than 600° C.

CITATION LIST

Patent Literature

Patent Literature 1: Japanese Patent Application Publication No. 2013-104109
Patent Literature 2: Japanese Patent Application Publication No. 2013-199663
Patent Literature 3: Japanese Patent Application Publication No. 1-68449
Patent Literature 4: Japanese Patent Application Publication No. 8-41595

Patent Literature 5: Japanese Patent Application Publication No. 2016-50328

SUMMARY OF INVENTION

Technical Problem

However, even with use of the above described techniques, there are cases where sufficient corrosion resistance when exposed to a molten salt of 600° C. (hereinafter, referred to as molten-salt corrosion resistance) cannot be obtained.

It is an object of the present disclosure to provide an austenitic heat resistant alloy capable of exhibiting sufficient molten-salt corrosion resistance even when exposed to a molten salt of 600° C., and a production method thereof, and an austenitic heat-resistant alloy material.

Solution to Problem

An austenitic heat resistant alloy of the present disclosure includes a base metal, and a Ni—Fe oxide having a spinet type structure on or above the surface of the base metal. The base metal has a chemical composition consisting of: in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Zr: 0 to 0.1000%, Ca: 0 to 0.0500%, REM: 0 to 0.2000%, Hf: 0 to 0.2000%, Pd: 0 to 0,2000%, P: 0.040% or less, S: 0.010% or less, N: less than 0.020%, 0: 0.0050% or less, Mo: less than 0.5%, Co: 0 to 0.80%, and Cu: 0 to 0.50%, with the balance being Fe and impurities.

The austenitic heat-resistant alloy material of the present disclosure includes a base metal, $Cr_2O_3$, (Fe, Cr, Ni)$_3O_4$, and $NaFeO_2$. The base metal has a chemical composition consisting of, in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Zr: 0 to 0.1000%, Ca: 0 to 0.0500%, REM: 0 to 0.2000%, Hf: 0 to 0.2000%, Pd: 0 to 0.2000%, P: 0.040% or less, S: 0.010% or less, N: less than 0.020%, O: 0.0050% or less, Mo: less than 0.5%, Co: 0 to 0.80%, and Cu: 0 to 0.50%, with the balance being Fe and impurities. $Cr_2O_3$ is disposed on the surface of the base metal. (Fe, Cr, Ni)$_3O_4$ is disposed on the $Cr_2O_3$. $NaFeO_2$ is disposed on the (Fe, Cr, Ni)$_3O_4$.

The method for producing an austenitic heat resistant alloy of the present disclosure includes a preparation step, a pretreatment step, a scale removal step, and a Ni—Fe oxide forming step. In the preparation step, a starting material having the above described chemical composition of the base metal of the austenitic heat resistant alloy is prepared. In the pretreatment step, the starting material is immersed in a solution containing nitric acid and hydrofluoric acid and is pretreated. In the scale removal step, the starting material is taken out of the solution, and oxide scale on the surface of the starting material is removed. In the Ni—Fe oxide forming step, the starting material after removal of the oxide scale on the surface is immersed in a solution which contains nitric acid and hydrofluoric acid, and in which the concentration of nitric acid is higher than the concentration of hydrofluoric acid, to form a Ni—Fe oxide having a spinel type structure on or above the surface of the starting material.

Advantageous Effects of Invention

An austenitic heat resistant alloy and an austenitic heat-resistant alloy material of the present disclosure have sufficient molten-salt corrosion resistance even when exposed to a molten salt of 600° C. Moreover, the austenitic heat resistant alloy of the present disclosure is obtained, for example, by a production method of the present disclosure.

DESCRIPTION OF EMBODIMENTS

The present inventors have conducted studies to improve a molten-salt corrosion resistance of an austenitic heat resistant alloy and an austenitic heat-resistant alloy material. As a result, the present inventors have found the following findings.

Conventionally, in order to increase the corrosion resistance of a heat resistant steel, a Cr oxide film mainly composed of $Cr_2O_3$ has been formed on the surface of a heat resistant steel. This enables to suppress outward diffusion of the components of the heat resistant steel, thereby improving the corrosion resistance of the heat resistant steel. However, $Cr_2O_3$ is active against a molten salt such as molten nitrate salt. For that reason, the $Cr_2O_3$ will dissolve in the molten salt as chromate ions. Therefore, it is difficult to improve the molten-salt corrosion resistance of an austenitic heat resistant alloy by the method of forming a Cr oxide film as in conventional methods.

On the other hand, for example, when a film mainly composed of a Fe oxide is formed on the surface of the base metal of an austenitic heat resistant alloy, an oxide scale mainly composed of $Fe_3O_4$ and $Fe_2O_3$ is formed on the surface of the base metal of the austenitic heat resistant alloy in a molten salt. The growth rates of $Fe_3O_4$ and $Fe_2O_3$ are significantly fast. Furthermore, since the $Fe_3O_4$ and $Fe_2O_3$ cannot suppress inward diffusion of oxygen from the molten salt, it is difficult to improve the molten-salt corrosion resistance of an austenitic heat resistant alloy by the film mainly composed of Fe oxide.

Further, for example, when a film mainly composed of a Ni oxide is formed on the surface of the base metal, an oxide mainly composed of NiO is formed on the surface of the base metal of an austenitic heat resistant alloy in a molten salt. Oxidation speed of NiO is fast. Further, since NiO cannot suppress inward diffusion of oxygen, Na, and K, etc., from a molten salt, even a film mainly composed of a Ni oxide can hardly improve molten-salt corrosion resistance of a heat resistant steel.

After diligent study, the present inventors have found that it is possible to improve molten-salt corrosion resistance of an austenitic heat resistant alloy by forming an oxide different from a conventional Cr oxide film on or above the surface of the base metal of the austenitic heat resistant alloy.

Specifically, in Examples to be described below, a molten salt corrosion test was conducted by using alloy materials shown in Table 1 to determine corrosion weight losses (mg/cm$^2$). The results of the molten salt corrosion test revealed that, as shown in Table 2, the corrosion weight loss of the alloy plate of Test No. 4 was 3.6 mg/cm$^2$, which was lower than a corrosion weight loss of 10.8 mg/cm$^2$ of the alloy plate of Test No. 13. However, the chemical composition of the base metal of the alloy plate of Test No. 4 was the same as the chemical composition of the base metal of the alloy plate of Test No. 13.

To elucidate this cause, the present inventors analyzed in detail oxides on the surface of the base metal of each alloy plate of Test Nos. 4 and 13.

First, the present inventors analyzed a section of an oxide on the surface of the base metal of the alloy plate of Test No. 4 by using XRD. From a depth profile of the oxide on the surface of the base metal of the alloy plate of Test No. 4, it was found that Ni and Fe are contained in the oxide on the surface of the base metal of the alloy plate of Test No. 4. Next, the present inventors performed. Raman analysis on the oxide on the surface of the base metal of the alloy plate of Test No. 4. As a result, a peak of 700 to 710 $cm^{-1}$, which is peculiar to the oxide having a spinel type structure, was confirmed in the oxide on the surface of the base metal of the alloy plate of Test No. 4.

On the other hand, a conventional Cr oxide film mainly composed of $Cr_2O_3$ was formed on the surface of the base metal of the alloy plate of Test No. 13.

From the results of analysis described above, the present inventors considered that if an austenitic heat resistant alloy included a Ni—Fe oxide having a spinel type structure on or above the surface of the base metal, the molten-salt corrosion resistance thereof would be improved. The reason why a Ni—Fe oxide having a spinel type structure improves molten-salt corrosion resistance of an austenitic heat resistant alloy is considered as follows. When an austenitic heat resistant alloy includes the Ni—Fe oxide having a spinel type structure on or above the surface of the base metal, $NaFeO_2$ having a fast growth rate is formed with the Ni—Fe oxide as a nucleus in a molten salt in a very early stage of corrosion. In contrast to a conventional Cr oxide film, $NaFeO_2$ hardly dissolves into a molten salt. For that reason, $NaFeO_2$ suppresses contact between the molten salt and the base metal of the austenitic heat resistant alloy. Thereafter, (Fe, Cr, Ni)$_3O_4$ is formed between $NaFeO_2$ and the base metal of the austenitic heat resistant alloy. The (Fe, Cr, Ni)$_3O_4$ suppresses inward diffusion of the molten salt components (Na ion and K ion) toward the base metal side of the austenitic heat resistant alloy. Thereafter, further, a Cr oxide is formed between the (Fe, Cr, Ni)$_3O_4$ and the base metal of the austenitic heat resistant alloy. The Cr oxide suppresses outward diffusion of the components of the austenitic heat resistant alloy. This suppresses growth of oxide scale. As a result, corrosion of the base metal is suppressed, thus improving the molten-salt corrosion resistance of the austenitic heat resistant alloy.

The austenitic heat resistant alloy of the present disclosure, which has been completed based on the above described findings, includes a base metal, and a Ni—Fe oxide having a spinel type structure on or above the surface of the base metal. The base metal has a chemical composition consisting of, in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Zr: 0 to 0.1000%, Ca: 0 to 0.0500%, REM: 0 to 0.2000%, Hf: 0 to 0.2000%, Pd: 0 to 0.2000%, P: 0.040% or less, S: 0.010% or less, N: less than 0.020%, O: 0.0050% or less, Mo: less than 0.5%, Co: 0 to 0.80%, and Cu: 0 to 0.50%, with the balance being Fe and impurities.

The austenitic heat resistant alloy of the present disclosure includes the Ni—Fe oxide having a spinel type structure on or above the surface of the base metal. For that reason, the austenitic heat resistant alloy of the present disclosure has sufficient molten-salt corrosion resistance even when exposed to a molten salt of 600° C.

Preferably, the Ni—Fe oxide having a spinel type structure includes $NiFe_2O_4$.

Preferably, the austenitic heat resistant alloy further includes a Cr oxide between the base metal and the Ni—Fe oxide.

In this case, the molten-salt corrosion resistance of the austenitic heat resistant alloy is further improved.

Preferably, the Cr oxide includes one or more kinds selected from the group consisting of $Cr_2O_3$ and $Cr_2O_3 \cdot yH_2O$. Where, y is any rational number.

Preferably, the chemical composition of the base metal of the austenitic heat resistant alloy contains, in mass %, Zr: 0.0005 to 0.1000%.

In this case, a high-temperature strength of the austenitic heat resistant alloy is improved.

Preferably, the chemical composition of the base metal of the austenitic heat resistant alloy contains, in mass %, Ca: 0.0005 to 0.0500%.

In this case, hot workability of the austenitic heat resistant alloy is improved.

Preferably, the chemical composition of the base metal of the austenitic heat resistant alloy contains at least one kind selected from the group consisting of, in mass %, REM: 0.0005 to 0.2000%, Hf: 0.0005 to 0.2000%, and Pd: 0.0005 to 0.2000%.

In this case, creep strength of the austenitic heat resistant alloy is improved.

An austenitic heat-resistant alloy material of the present disclosure includes a base metal, $Cr_2O_3$, (Fe, Cr, Ni)$_3O_4$, and $NaFeO_2$. The base metal has a chemical composition consisting of: in mass %, C: 0.030 to 0.120%, Si: 0.02 to 1.00%, Mn: 0.10 to 2.00%, Cr: 20.0% or more to less than 28.0%, Ni: more than 35.0% to 50.0% or less, W: 4.0 to 10.0%, Ti: 0.01 to 0.30%, Nb: 0.01 to 1.00%, sol. Al: 0.0005 to 0.0400%, B: 0.0005 to 0.0100%, Zr: 0 to 0.1000%, Ca: 0 to 0.0500%, REM: 0 to 0.2000%, Hf 0 to 0.2000%, Pd: 0 to 0.2000%, P: 0.040% or less, S: 0.010% or less, N: less than 0.020%, O: 0.0050% or less, Mo: less than 0.5%, Co: 0 to 0.80%, and Cu: 0 to 0.50%, with the balance being Fe and impurities. The $Cr_2O_3$ is disposed on the surface of the base metal. The (Fe, Cr, Ni)$_3O_4$ is disposed on the $Cr_2O_3$. The $NaFeO_2$ is disposed on the (Fe, Cr, Ni)$_3O_4$.

The austenitic heat-resistant alloy material of the present disclosure includes $Cr_2O_3$, (Fe, Cr, Ni)$_3O_4$, and $NaFeO_2$ on the surface of the base metal in this order from the base metal side. For that reason, the austenitic heat-resistant alloy material of the present disclosure exhibits excellent molten-salt corrosion resistance.

Preferably, the chemical composition of the base metal of the austenitic heat-resistant alloy material contains, in mass %, Zr: 0.0005 to 0.1000%.

In this case, the high-temperature strength of the austenitic heat-resistant alloy material is improved.

Preferably, the chemical composition of the base metal of the austenitic heat-resistant alloy material contains, in mass %, Ca: 0.0005 to 0.0500%.

In this case, hot workability of the austenitic heat-resistant alloy material is improved.

Preferably, the chemical composition of the base metal of the austenitic heat-resistant alloy material contains at least one kind selected from the group consisting of, in mass %, REM: 0.0005 to 0.2000%, Hf: 0.0005 to 0.2000%, and Pd: 0.0005 to 0.2000%.

In this case, creep strength of the austenitic heal-resistant alloy material is improved.

A method for producing an austenitic heat resistant alloy of the present disclosure includes a preparation step, a pretreatment step, a scale removal step, and a Ni—Fe oxide forming step. In the preparation step, a starting material having a chemical composition of the base metal of the above described austenitic heat resistant alloy is prepared. In the pretreatment step, the starting material is pretreated by immersing the starting material in a solution containing nitric acid and hydrofluoric acid. In the scale removal step, oxide scale on the surface of the starting material is removed after taking out the starting material from the solution. In the Ni—Fe oxide forming step, a Ni—Fe oxide having a spinel type structure on or above the surface of the starting material is formed by immersing the starting material after removal of the oxide scale on the surface, in a solution which contains nitric acid and hydrofluoric acid and in which the concentration of nitric acid is higher than the concentration of hydrofluoric acid.

Hereinafter, an austenitic heat resistant alloy of the present disclosure will be described in detail.

[Austenitic Heat Resistant Alloy]

The austenitic heat resistant alloy of the present disclosure includes a base metal, and a Ni—Fe oxide having a spinet type structure, on or above the surface of the base metal.

[Chemical Composition of Base Metal]

The chemical composition of the base metal of an austenitic heat resistant alloy of the present disclosure contains the following elements. Unless otherwise stated, "%" regarding an element means "mass %".

C: 0.030 to 0.120%

Carbon (C) is a necessary element for forming carbides and thereby obtaining high-temperature tensile strength and high-temperature creep strength required as an austenitic heat resistant alloy for high temperatures around 600° C. This effect cannot be obtained if the C content is too low. On the other hand, if the C content is too high, undissolved carbides are generated. Further if the C content is too high, Cr carbide is excessively generated, thus deteriorating weldability of an austenitic heat resistant alloy. Therefore, the C content is 0.030 to 0.120%. A lower limit of the C content is preferably 0.040%, and more preferably 0.050%. An upper limit of the C content is preferably 0.110%, and more preferably 0.100%.

Si: 0.02 to 1.00%

Silicon (Si), which is added as a deoxidizer during steel making, is also a necessary element to improve the oxidation resistance of an austenitic heat resistant alloy. This effect cannot be obtained if the Si content is too low. On the other hand, if the Si content is too high, hot workability of an austenitic heat resistant alloy deteriorates. Therefore, the Si content is 0.02 to 1.00%. A lower limit of the Si content is preferably 0.05%, and more preferably 0.10%. An upper limit of the Si content is preferably 0.80%, and more preferably 0.50%.

Mn: 0.10 to 2.00%

Manganese (Mn) combines with S, which is an impurity contained in an austenitic heat resistant alloy, to form an MnS, thereby improving hot workability. This effect cannot be obtained if the Mn content is too low. On the other hand, if the Mn content is too high, an austenitic heat resistant alloy is embrittled, rather deteriorating hot workability. Further if the Mn content is too high, weldability of the austenitic heat resistant alloy deteriorates. Therefore, the Mn content is 0.10 to 2.00%. A lower limit of the Mn content is preferably 0.20%, more preferably 0.30%, and further preferably 0.50%. An upper limit of the Mn content is preferably 1.80%, more preferably 1.50%, and further preferably 1.20%.

Cr: 20.0% or More to Less Than 28.0%

Chromium (Cr) is an important element for improving molten-salt corrosion resistance. Further, Cr improves the oxidation resistance of an austenitic heat resistant alloy. To ensure excellent molten-salt corrosion resistance in a molten salt of 400 to 600° C., a Cr content of not less than 20.0% is required. Conventionally, it is generally considered that corrosion resistance improves as the Cr content increases. However, if the Cr content is too high, a Cr oxide film mainly composed of Cr oxide is formed. Since the Cr oxide film dissolves into a molten salt, the molten-salt corrosion resistance of an austenitic heat resistant alloy deteriorates. Further, if the Cr content is too high, structural stability deteriorates, and creep strength of the austenitic heat resistant alloy decreases. Furthermore, if the Cr content is too high, weldability of the austenitic heat resistant alloy deteriorates. Therefore, the Cr content is 20.0% or more to less than 28.0%. A lower limit of the Cr content is preferably 20.5%, more preferably 21.0%, and further preferably 22.0%. An upper limit of the Cr content is preferably 27.5%, more preferably 26.5%, and further preferably 26.0%.

Ni: More Than 35.0% to 50.0% or Less

Nickel (Ni) is an element that stabilizes an austenite structure, and is an important alloying element to ensure molten-salt corrosion resistance. To obtain a stable austenitic structure, a Ni content of more than 35.0% is required from the balance between itself and the Cr content described above. On the other hand, if the Ni content is too high, an oxide film made up of a single layer of NiO is formed in a molten salt. In this case, the molten-salt corrosion resistance of an austenitic heat resistant alloy in a molten salt deteriorates. Further, if the Ni content is too high, increase in cost will result. Further, if the Ni content is too high, creep strength of an austenitic heat resistant alloy decreases. Therefore, the Ni content is more than 35.0% to 50.0% or less. A lower limit of the Ni content is preferably 38.5%, more preferably 40.0%, and further preferably 41.0%. An upper limit of the Ni content is preferably 48.0%, more preferably 47.0%, and further preferably 45.0%.

W: 4.0 to 10.0%

Tungsten (W) suppresses grain sliding creep, which occurs preferentially in a high-temperature region, by solid-solution strengthening effect. If the W content is too low, this effect cannot be obtained. On the other hand, if the W content is too high, since an austenitic heat resistant alloy is excessively hardened, hot workability of the austenitic heat resistant alloy deteriorates. Further if the W content is too high, weldability of the austenitic heat resistant alloy deteriorates. Therefore, the W content is 4.0 to 10.0%. A lower limit of the W content is preferably 4.5%, and more preferably 6.0%. An upper limit of the W content is preferably 9.0%, and more preferably 8.0%.

Ti: 0.01 to 0.30%

Titanium (Ti) precipitates as a carbonitride, thereby increasing the high temperature strength of an austenitic heat resistant alloy. If the Ti content is too low, this effect cannot be obtained. On the other hand, if the Ti content is too high, undissolved carbonitride and/or oxide is generated, thus the austenite grain is caused to have a mixed grain size. Further if the Ti content is too high, nonuniform creep deformation and deterioration of ductility are caused. Therefore, the Ti content is 0.01 to 0.30%. A lower limit of the Ti content is preferably 0.03%, and more preferably 0.05%. An upper limit of the Ti content is preferably 0.25%, and more preferably 0.20%.

Nb: 0.01 to 1.00%

Niobium (Nb) precipitates as carbonitride to increase the high temperature strength of an austenitic heat resistant alloy. If the Nb content is too low, this effect cannot be obtained. On the other hand, if the Nb content is too high, weldability of an austenitic heat resistant alloy deteriorates. Therefore, the Nb content is 0.01 to 1.00%. A lower limit of the Nb content is preferably 0.05%, and more preferably 0.10%. An upper limit of the Nb content is preferably 0.60%, and more preferably 0.50%.

Sol. Al: 0.0005 to 0.0400%

Aluminum (Al) is used as a deoxidizes. If the Al content is too low, this effect cannot be obtained. On the other hand, if a large amount of Al remains, structural stability of an austenitic heat resistant alloy deteriorates. Therefore, the Al content is 0.0005 to 0.0400%. A lower limit of the Al content is preferably 0.0010%, and more preferably 0.0050%. An upper limit of the Al content is preferably 0.0300%, and more preferably 0.0200%. In the present disclosure, an Al content refers to the content of acid-soluble Al (sol. Al).

B: 0.0005 to 0.0100%

Boron (B) suppresses oxides or nitrides by reducing the contents of N and O to be described later. If the B content is too low, this effect cannot be obtained. On the other hand, if the B content is too high, weldability of an austenitic heat resistant alloy deteriorates. Therefore, the B content is 0.0005 to 0.0100%. A lower limit of the B content is preferably 0.0007%, and more preferably 0.0010%. An upper limit of the B content is preferably 0.0080%, and more preferably 0.0050%.

The balance of the chemical composition of the base metal of an austenitic heat resistant alloy of the present disclosure consists of Fe and impurities. Here, the term "impurities" in the chemical composition of the base metal means what are introduced from ores and scraps as raw materials, or a production environment when industrially producing an austenitic heat resistant alloy, and what are permitted within a range not adversely affecting the austenitic heat resistant alloy of the present disclosure.

[Optional Elements]

The chemical composition of the base metal of an austenitic heat resistant alloy of the present disclosure may contain the following elements as optional elements.

Zr: 0 to 0.1000%

Zirconium (Zr) is an optional element and may not be contained. In other words, the Zr content may be 0%. If contained, Zr strengthens grain boundaries, thereby improving high temperature strength of an austenitic heat resistant alloy. This effect will be obtained if even a slight amount of Zr is contained. On the other hand, if the Zr content is too high, undissolved oxide and nitride are generated, similarly to the case of Ti, thus promoting grain sliding creep and non-uniform creep deformation. Further, if the Zr content is too high, creep strength and ductility in a high-temperature region of an austenitic heat resistant alloy deteriorate. Therefore, the Zr content is 0 to 0.1000%. A lower limit of the Zr content is preferably 0.0005%, and more preferably 0.0010%. An upper limit of the Zr content is preferably 0.0600%.

Ca: 0 to 0.0500%

Calcium (Ca) is an optional element and may not be contained. In other words, the Ca content may be 0%. If contained, Ca combines with S thereby stabilizing S, and improves hot workability of an austenitic heat resistant alloy. This effect will be obtained if even a slight amount of Ca is contained. On the other hand, if the Ca content is too high, toughness, ductility and steel quality of an austenitic heat resistant alloy deteriorate. Therefore, the Ca content is 0 to 0.0500%. A lower limit of the Ca content is preferably 0.0005%. An upper limit of the Ca content is preferably 0.0100%.

REM: 0 to 0.2000%

Rare earth metals (REM) are optional elements and may not be contained. In other words, the REM content may be 0%. If contained, REM form stable oxides and sulfides, thereby suppressing undesirable effects of O and S. If REM are contained, corrosion resistance, hot workability, creep strength and creep ductility of an austenitic heat resistant alloy will be improved. These effects will be obtained if even a slight amount of REM is contained. On the other hand, if the REM content is too high, inclusions such as oxides are excessively generated, and thereby hot workability and weldability of an austenitic heat resistant alloy deteriorate. Therefore, the REM content is 0 to 0.2000%. A lower limit of the REM content is preferably 0.0005%, and more preferably 0.0010%. An upper limit of the REM content is preferably 0.1000%. The REM in the present disclosure means 17 elements including elements from Lanthanum (La) of element number 57 to Lutetium (Lu) of element number 71 in the periodic table, added with Yttrium (Y) and Scandium (Sc). The REM content means a total content of these elements.

Hf: 0 to 0.2000%

Hafnium (Hf) is an optional element and may not be contained. In other words, the Hf content may be 0%. If contained, Hf forms stable oxides and sulfides, thereby suppressing undesirable effects of O and S. If Hf is contained, corrosion resistance, hot workability, creep strength and creep ductility of an austenitic heat resistant alloy will be improved. These effects will be obtained if even a slight amount of Hf is contained. On the other hand, if the Hf content is too high, inclusions such as oxides are excessively generated, thereby deteriorating hot workability and weldability of an austenitic heat resistant alloy. Therefore, the Hf content is 0 to 0.2000%. A lower limit of the Hf content is preferably 0.0005%, and more preferably 0.0010%. An upper limit of the Hf content is preferably 0.1000%.

Pd: 0 to 0.2000%

Palladium (Pd) is an optional element and may not be contained. In other words, the Pd content may be 0%. If contained, Pd forms stable oxides and sulfides, thereby suppressing undesirable effects of O and S. If Pd is contained, corrosion resistance, hot workability, creep strength and creep ductility of an austenitic heat resistant alloy will be improved. These effects will be obtained if even a slight amount of Pd is contained. On the other hand, if the Pd content is too high, inclusions such as oxides are excessively generated, thereby deteriorating hot workability and weldability of an austenitic heat resistant alloy. Therefore, the Pd content is 0 to 0.2000%. A lower limit of the Pd content is preferably 0.0005%, and more preferably 0.0010%. An upper limit of the Pd content is preferably 0.1000%.

The impurities include, for example, the following elements. The contents of these elements are limited from the following reasons.

P: 0.040% or Less

Phosphorus (P) is an impurity which is unavoidably contained. In other words, a lower limit of the P content is more than 0%. P deteriorates weldability and hot workability of an austenitic heat resistant alloy. Therefore, the P content is 0.040% or less. An upper limit of the P content is preferably 0.030%. The P content is preferably as low as possible. However, extreme reduction of the P content will significantly increase the production cost. Therefore, when taking into consideration of industrial production, a lower limit of the P content is preferably 0.0005%.

S: 0.010% or Less

Sulfur (S) is an impurity which is unavoidably contained. In other words, a lower limit of the S content is more than 0%. S deteriorates weldability and hot workability of an austenitic heat resistant alloy. Therefore, the S content is 0.010% or less. An upper limit of the S content is preferably 0.008%. The S content is preferably as low as possible. However, in a case in which a slight amount of S is contained to increase the fluidity during welding, not less than 0.004% of S may be contained.

N: Less Than 0.020%

Nitrogen (N) is an impurity which is unavoidably contained. In other words, a lower limit of the N content is more than 0%. If the N content is too high, undissolved carbonitrides of Ti and B are generated, thereby causing the structure of an austenitic heat resistant alloy to have a mixed grain size. In this case, grain sliding creep and non-uniform creep deformation in a high-temperature region is promoted, thereby decreasing strength of an austenitic heat resistant alloy. Therefore, the N content is less than 0.020%. An upper limit of the N content is preferably 0.016%, and more preferably 0.010%. The N content is preferably as low as possible. However, extreme reduction of the N content will significantly increase the production cost. Therefore, when taking into consideration of industrial production, a lower limit of the N content is preferably 0.005%.

O: 0.0050% or Less

Oxygen (O) is an impurity which is unavoidably contained. In other words, a lower limit of the O content is more than 0%. If the O content is too high, undissolved oxides of Ti and Al are generated, thereby causing the structure of an austenitic heat resistant alloy to have a mixed grain size. In this case, grain sliding creep and non-uniform creep deformation in a high-temperature region are promoted, thus decreasing strength of an austenitic heat resistant alloy. Therefore, the O content is 0.0050% or less. An upper limit of the O content is preferably 0.0030%. The O content is preferably as low as possible. However, extreme reduction of the O content will significantly increase the production cost. Therefore, when taking into consideration of industrial production, a lower limit of the O content is preferably 0.0005%.

Mo: Less Than 0.5%

Molybdenum (Mo) is an impurity which is unavoidably contained. In other words, the lower limit of the Mo content is more than 0%. If the Mo content is too high, which causes an austenitic heat resistant alloy to produce an embrittled layer in a high-temperature environment. Further, if the Mo content is too high, corrosion resistance of an austenitic heat resistant alloy deteriorates. Therefore, the Mo content is less than 0.5%. An upper limit of the Mo content is preferably 0.3%, and more preferably 0.1%. The Mo content is preferably as low as possible. However, extreme reduction of the Mo content will significantly increase the production cost. Therefore, when taking into consideration of industrial production, a lower limit of the Mo content is preferably 0.01%.

Co: 0 to 0.80%

Cobalt (Co) is an impurity which may be mixed from scraps or the like. Co may not be contained. In other words, the Co content may be 0%. If the Co content is too high, hot workability of an austenitic heat resistant alloy deteriorates. Therefore, Co is not positively added. The Co content is 0 to 0.80%. If Co is contained, the lower limit of the Co content is more than 0%. However, in a case in which a slight amount of Co is contained to improve creep strength, not less than 0.01% of Co may be contained.

Cu: 0 to 0.50%

Copper (Cu) is an impurity which may be mixed from scraps or the like. Cu may not be contained. In other words, the Cu content may be 0%. If the Cu content is too high, grain sliding creep in a high-temperature region will be promoted. Therefore, Cu is not positively added. The Cu content is 0 to 0.50%. If Cu is contained, a lower limit of the Cu content is more than 0%. An upper limit of the Cu content is preferably 0.20%. However, in a case in which a slight amount of Cu is contained to increase strength, not less than 0.01% of Cu may be contained.

[Microstructure of Base Metal and Shape of Austenitic Heat Resistant Alloy]

The microstructure of the base metal of an austenitic heat resistant alloy of the present disclosure is an austenite single phase, excepting precipitates. The shape of the austenitic heat resistant alloy of the present disclosure will not be particularly limited. The shape of the austenitic heat resistant alloy may be any of a tube, a plate, a rod, a wire, and shape steel. The austenitic heat resistant alloy can be suitably used as a tube.

[Ni—Fe Oxide]

The austenitic heat resistant alloy includes the Ni—Fe oxide having a spinel type structure on or above the surface of the base metal. As a result of this, $NaFeO_2$ having a fast growth rate is formed with the Ni—Fe oxide as a nucleus in a molten salt in a very early stage of corrosion. In contrast to a conventional Cr oxide film, $NaFeO_2$ hardly dissolves into a molten salt. For that reason, $NaFeO_2$ suppresses contact between the molten salt and the base metal of a heat resistant steel. Thereafter, $(Fe, Cr, Ni)_3O_4$ and a Cr oxide are formed, and molten-salt corrosion resistance of the austenitic heat resistant alloy is improved.

The Ni—Fe oxide having a spinel type structure is an oxide that has a spinel type structure and contains Ni and Fe. The spinel type structure is a kind of structure of inorganic compound, which belongs to a cubic system and can be represented by a composition formula of $AB_2X_4$. In a case of the Ni—Fe oxide, A or B in the composition formula corresponds to Ni or Fe, and X in the composition formula corresponds to O. The Ni—Fe oxide having a spinel type structure may be $NiFe_2O_4$ or may be $Ni_2FeO_4$. In the Ni—Fe oxide having a spinel type structure, a part of Fe may be replaced by Cr. The Ni—Fe oxide having a spinel type structure may be, for example, $(Ni, Fe, Cr)_3O_4$. In other words, the Ni—Fe oxide having a spinel type structure is one or more kinds selected from the group consisting of $NiFe_2O_4$, $Ni_2FeO_4$, and $(Ni, Fe, Cr)_3O_4$. Preferably, the Ni—Fe oxide having a spinel type structure includes $NiFe_2O_4$.

The Ni—Fe oxide having a spinel type structure may cover the entire surface of the base metal of an austenitic heat resistant alloy, or may cover a part of the surface of the base metal. The Ni—Fe oxide having a spinel type structure may be formed in contact, or without contact, with the surface of the base metal of an austenitic heat resistant alloy. Moreover, the Ni—Fe oxide having a spinel type structure may be an outermost layer, or may not be an outermost layer. As long as the Ni—Fe oxide is disposed on or above the surface of the base metal of an austenitic heat resistant alloy, formation of $NaFeO_2$ and subsequent formation of $(Fe, Cr, Ni)_3O_4$ and $Cr_2O_3$ occur in a molten salt, and thus molten-salt corrosion resistance of the austenitic heat resistant alloy is improved. On the other hand, when the Ni—Fe oxide having a spinel type structure is formed as an outermost layer, the formation of $NaFeO_2$ is promoted, and effect of $NaFeO_2$ to suppress the contact between the molten salt and the base metal of the austenitic heat resistant alloy is enhanced. Therefore, the Ni—Fe oxide having a spinel type structure is preferably formed as an outermost layer.

[Identification Method of Ni—Fe Oxide]

The Ni—Fe oxide having a spinel type structure is identified by the following method. First, a test specimen including an oxide on the surface of the base metal of an austenitic heat resistant alloy is sampled. A depth profile by X-ray Photoelectron Spectroscopy (XPS) is created in a thickness direction of the oxide for the surface of the oxide. Regarding each element determined by the depth profile, state analysis is performed to separate the concentration of each element into the concentration of an element existing as an oxide and the concentration of an element existing as metal. It is confirmed that Ni and Fe are included in elements existing as an oxide in a range from the surface of an oxide to a depth position at which the detection intensity of O (oxygen) becomes a half of the detection intensity of oxygen at the surface of the oxide. XPS is measured under the following conditions.

Apparatus: XPS measurement apparatus (ULVAC-PHI, Inc., Quantera SXM)

X-ray: mono-AlKα ray (hv=1486.6 eV), X ray diameter: 100 μmΦ

Neutralization gun: 1.0 V, 20 μA

Sputtering conditions: Ar$^+$, Acceleration voltage: 1 kV, Raster: 2×2 mm

Sputtering speed: 1.8 nm/min. ($SiO_2$ equivalent value).

Next, the Raman spectroscopy is performed on oxides on the surface of the base metal of an austenitic heat resistant alloy. From the chart obtained by the Raman spectroscopy, a peak of 700 to 710 cm$^{-1}$, which is peculiar to an oxide having a spinel type structure, is identified. Thereby, formation of the Ni—Fe oxide on the surface of the base metal of the austenitic heat resistant alloy is identified. The Raman spectroscopy is performed under the following conditions.

Apparatus: microscopic laser Raman spectrometry apparatus (LabRAM HR Evolution, manufactured by HORIBA Ltd.)

Measurement arrangement: 180° back scattering arrangement

Excitation wavelength: 532 nm

Diffraction grating ruled line: 600 lines/mm

ND Filter: 25%

Power: 2.3 mW

Object lens: 50 magnification

[Thickness of Ni—Fe Oxide]

A thickness of the Ni—Fe oxide is preferably, for example, 2.0 to 7.0 nm. If the thickness of the Ni—Fe oxide is 2.0 nm or more, since formation of $Cr_2O_3$ is suppressed on the surface of the austenitic heat resistant alloy during usage in a molten salt environment, and formation of $NaFeO_2$ is promoted, molten-salt corrosion resistance of the austenitic heat resistant alloy is stably improved. On the other hand, the upper limit of the thickness of the Ni—Fe oxide will not be particularly limited. However, if the thickness of the Ni—Fe oxide is 7.0 nm or less, it is possible to prevent processing time from being prolonged, which is preferable in the viewpoint of productivity. A lower limit of the thickness of the Ni—Fe oxide is more preferably 4.0 nm. An upper limit of the thickness of the Ni—Fe oxide is more preferably 6.0 nm.

[Measurement Method of Thickness of Ni—Fe Oxide]

As in the above described identification method of the Ni—Fe oxide, XPS measurement is performed in the thickness direction of the oxide for oxides on the surface of the base metal of the austenitic heat resistant alloy. Let two points, which are located in front and in the back of a peak position at which the concentrations (at %) of Ni and Fe existing as an oxide are maximum, and at which the concentrations (at %) of Ni and Fe existing as an oxide are halves of their maximum values, be an A point and a B point, respectively. A distance in the depth direction between the A point and the B point is defined as the thickness of the Ni—Fe oxide.

[Cr Oxide]

The austenitic heat resistant alloy preferably further includes the Cr oxide between the base metal of the austenitic heat resistant alloy and the Ni—Fe oxide. The Cr oxide forms $Cr_2O_3$ in a molten salt, and suppresses outward diffusion of components of the base metal of the austenitic heat resistant alloy. For that reason, the growth of oxide scale is suppressed. Moreover, if the Cr oxide is formed between the base metal of the austenitic heat resistant alloy and the Ni—Fe oxide, $Cr_2O_3$ will be disposed under $NaFeO_2$ (between the base metal of the austenitic heat resistant alloy and $NaFeO_2$) in a molten salt. In this case, contact between the $Cr_2O_3$ and the molten salt is suppressed by $NaFeO_2$. Therefore, dissolution of $Cr_2O_3$ into the molten salt will be suppressed. In other words, in a case of a two-layer structure in which the Cr oxide and the Ni—Fe oxide are laminated in this order from the surface of the base metal of the austenitic heat resistant alloy, molten-salt corrosion resistance of the austenitic heat resistant alloy will be further improved.

The Cr oxide is an oxide of Cr. The Cr oxide is, for example, one or more kinds selected from the group consisting of $Cr_2O_3$, $CrO.OH.xH_2O$ (hydrated oxyhydroxide), and $Cr_2O_3.yH_2O$ (hydrated oxide). The Cr oxide preferably contains one or more kinds selected from the group consisting of $Cr_2O_3$ and $Cr_2O_3.yH_2O$. Here, x in $CrO.OH.xH_2O$ is any rational number. Generally, x is around 1 to 2. y in $Cr_2O_3.yH_2O$ is any rational number. Generally, y is around 1 to 2.

[Identification Method of Composition of Cr Oxide and Position of Cr Oxide]

Under the same conditions as in the above described identification method of the Ni—Fe oxide, a depth profile by XPS is created for a test specimen including an oxide on the surface of the base metal of the austenitic heat resistant alloy. Regarding each element determined by the depth profile, state analysis is performed to separate the concentration of each element into the concentration of an element existing as an oxide and the concentration of an element existing as metal. It is confirmed that Cr is included in elements existing as an oxide in a range from the surface of an oxide to a depth position at which the detection intensity of O (oxygen) becomes a half of the detection intensity of oxygen at the surface of the oxide. Further, it is confirmed that peaks of Ni and Fe as oxides are located at a position shallower than the peak of Cr as an oxide (a position closer to the surface of an oxide). Thereby, it is identified that the Cr oxide is present between the base metal of the austenitic heat resistant alloy and the Ni—Fe oxide.

When identifying the composition of the Cr oxide, the Raman spectroscopy in addition to XPS analysis is performed on the oxide on the surface of the base metal of the austenitic heat resistant alloy under the same conditions as in the above described identification method of the Ni—Fe oxide. From the chart obtained by the Raman spectroscopy, a peak of around 550 cm$^{-1}$ which is peculiar to $Cr_2O_3$, or a peak of around 850 cm$^{-1}$ which is peculiar to $Cr_2O_3.yH_2O$ is identified. Thereby, the composition of the Cr oxide is identified.

[Thickness of Cr Oxide]

A thickness of the Cr oxide is, for example, 2.0 to 10.0 nm. If the thickness of the Cr oxide is 2.0 nm or more, formation of $Cr_2O_3$ is promoted between $NaFeO_2$ and the austenitic heat resistant alloy during usage in a molten salt environment, and molten-salt corrosion resistance of the austenitic heat resistant alloy is further stably improved. On the other hand, if the thickness of the Cr oxide is 10.0 nm or less, $NaFeO_2$ becomes more likely to be formed in a molten salt environment. A lower limit of the thickness of the Cr oxide is preferably 3.0 nm. An upper limit of the thickness of the Cr oxide is preferably 8.0 nm.

[Measurement Method of Thickness of Cr Oxide]

As in the above described identification method of the Cr oxide, XPS measurement is performed in the thickness direction of an oxide for the oxides on the surface of the base metal of the austenitic heat resistant alloy. Let two points, which are located in front and in the back of a peak position at which the concentration (at %) of Cr existing as an oxide is maximum, and at which the concentration (at %) of Cr is a half of its maximum value, be a C point and a D point, respectively. A distance in the depth direction between the C point and the D point is defined as the thickness of the Cr oxide.

[Production Method]

An austenitic heat resistant alloy of the present disclosure can be produced, for example, in the following production method. The production method includes a preparation step, a pretreatment step, a scale removal step, and a Ni—Fe oxide forming step. Hereinafter, a production method in a case of producing a seamless pipe will be described as an example. However, the production method of the present disclosure will not be limited to the case of producing a seamless pipe.

[Preparation Step]

In the preparation step, a starting material including a chemical composition of the base metal of the above described austenitic heat resistant alloy is prepared. The starting material may be a slab, a bloom, or a billet, each of which is produced by a continuous casting method (including a round continuous casting). Further, the starting material may be a billet produced by hot working an ingot which is produced by an ingot-making method. Furthermore, the starting material may be a billet produced by hot working from a slab or a bloom.

The starting material is charged into a heating furnace or a holding furnace, and is heated. The heating temperature is, for example, 1100 to 1350° C. The heated starting material is subjected to hot working. For example, the Mannesmann process is performed as the hot working. Specifically, the starting material is subjected to piercing-rolling by a piercing machine to produce a hollow shell. Subsequently, the starting material is subjected to drawing and rolling, and diameter adjusting rolling through a mandrel mill and a sizing mill to produce a seamless pipe. Hot extrusion or hot forging may be performed as the hot working. The temperature of the hot working is, for example, 500 to 1100° C.

As needed, heat treatment may be performed during producing process, or cold working may be performed, on the starting material which has been produced by hot working. Cold working is, for example, cold rolling and cold drawing. When cold working is performed, heat treatment for controlling the structure of the starting material may be performed. After a heat treatment, scale removal (removal of an oxide scale formed on the surface by shot blasting, pickling, or the like) may be carried out. Finally washing may be performed to remove foreign substances on the surface. By the above described steps, a starting material, which is a seamless pipe, is produced.

The starting material may be a steel plate. In this case, the starting material is subjected to hot working to produce a steel plate. Further, a welded steel pipe may be produced by welding a steel plate.

The starting material may be immersed in sulfuric acid after the hot working (after cold working if cold working is performed) and before the pretreatment step. As a result of this, the Ni—Fe oxide becomes more easily formed.

[Pretreatment Step]

In the pretreatment step, the starting material is pretreated by being immersed in a pretreatment solution containing nitric acid and hydrofluoric acid. As a result of this, an oxide scale such as of $Cr_2O_3$ and $Fe_3O_4$, which is formed on the surface of steel material after hot working or cold working, is dissolved, and is caused to rise up from the surface of the starting material. By removing this oxide scale in the following scale removal step, and subjecting the starting material to the Ni—Fe oxide forming step, the Ni—Fe oxide can be formed. The concentration of nitric acid of the pretreatment solution is, for example, 5 to 15 mass %. The concentration of hydrofluoric acid of the pretreatment solution is, for example, 2 to 5 mass %. The pretreatment solution contains a solvent in addition to nitric acid and hydrofluoric acid. The solvent is, for example, one or two kinds selected from the group consisting of water and an organic solvent which is dispersed or dissolved in water. The pretreatment solution may contain other components. The other components are, for example, one or more kinds selected from the group consisting of Fe ions, Cr ions, Ni ions, W ions, Mo ions and other ions of metal elements contained in the chemical composition of the base metal, and surfactants. Other components may be contained in an amount of 5 mass % or less in total. Particularly the Fe ion and the Ni ion out of the other components are limited in their contents. The Fe ion content is 3.8 mass % or less, and the Ni ion content is 0.7 mass % or less. If the Fe ion or the Ni ion is contained exceeding the aforementioned contents, formation of the Ni—Fe oxide having a spinel type structure is impaired in the Ni—Fe oxide forming step to be described below. On the other hand, since excessive reduction of the Fe ion and the Ni ion causes decrease in productivity, containment of 0.9 mass % or more of the Fe ion, and 0.1 mass % or more of the Ni ion is permitted.

In the pretreatment step, a temperature (processing temperature) of the pretreatment solution, and time (processing time) for which the starting material is immersed in the pretreatment solution can be appropriately set. The processing temperature is, for example, 20 to 50° C. The processing time is, for example, 2 to 25 hours.

[Scale Removal Step]

In the scale removal step, the starting material is taken out from the pretreatment solution and an oxide scale on the surface of the starting material is removed. The method for removing the oxide scale is, for example, water washing, shot blasting, and the like. By performing the scale removal step, the oxide scale on the surface is removed, and the Ni—Fe oxide is allowed to be formed in the following Ni—Fe oxide forming step.

[Ni—Fe Oxide Forming Step]

In the Ni—Fe oxide forming step, the starting material after removal of the oxide scale on the surface is immersed in a Ni—Fe oxide forming solution to form Ni—Fe oxide having a spinel type structure on or above the surface of the starting material. The Ni—Fe oxide forming solution contains nitric acid and hydrofluoric acid, in which the concentration of nitric acid is higher than the concentration of hydrofluoric acid. As a result of the concentration of nitric acid being higher than the concentration of hydrofluoric acid, formation of the Ni—Fe oxide is promoted. The concentration of nitric acid of the Ni—Fe oxide forming solution is, for example, 5 to 15 mass %. The concentration of hydrofluoric acid of the Ni—Fe oxide forming solution is, for example, 2 to 5 mass %. The concentration of nitric acid of the Ni—Fe oxide forming solution is preferably higher than the concentration of nitric acid of the pretreatment solution. The concentration of hydrofluoric acid of the Ni—Fe oxide forming solution is preferably higher than the concentration of hydrofluoric acid of the pretreatment solution.

The Ni—Fe oxide forming solution contains a solvent in addition to nitric acid and hydrofluoric acid. The solvent is, for example, one or more kinds selected from the group consisting of water and an organic solvent which is dispersed or dissolved in water. The Ni—Fe oxide forming solution may contain other additives. The other additives are, for example, one or more kinds selected from the group consisting of Fe ions, Cr ions, Ni ions, W ions, Mo ions and other ions of metal elements contained in the chemical composition of the base metal, and surfactants. Other additives may be contained in a total amount of 3.5 mass % or less. Among the other additives, particularly the Fe ion and the Ni ion are limited in their contents. The Fe ion content is 1.2 mass % or less, and the Ni ion content is 0.3 mass % or less. If the Fe ion or the Ni ion is contained exceeding the above described content, formation of the Ni—Fe oxide having a spinel type structure is impaired. On the other hand, since excessive reduction of the Fe ion and the Ni ion causes decrease in productivity, containment of 0.05 mass % or more of the Fe ion, and 0.1 mass % or more of the Ni ion is permitted.

In the Ni—Fe oxide forming step, a temperature (processing temperature) of the Ni—Fe oxide forming solution in the Ni—Fe oxide forming step, and time (processing time) for which the starting material is immersed in the Ni—Fe oxide forming solution can be appropriately set. The processing temperature is, for example, 20 to 50° C. The treatment time is, for example, 2 to 25 hours.

An austenitic heat resistant alloy of the present disclosure can be produced, for example, by the above described steps.

Hereinafter, an austenitic heat-resistant alloy material of the present disclosure will be described in detail.

[Austenitic Heat-Resistant Alloy Material]

An austenitic heat-resistant alloy material of the present disclosure includes a base metal, $Cr_2O_3$, $(Fe, Cr, Ni)_3O_4$, and $NaFeO_2$.

[Chemical Composition of Base Metal]

The chemical composition of the base metal of an austenitic heat-resistant alloy material of the present disclosure contains the following elements. Unless otherwise stated, "%" regarding an element means "mass %".

C: 0.030 to 0.120%

Carbon (C) is a necessary element for forming carbides and thereby obtaining high-temperature tensile strength and high-temperature creep strength required as an austenitic heat-resistant alloy material for high temperatures around 600° C. This effect cannot be obtained if the C content is too low. On the other hand, if the C content is too high, undissolved carbides are generated. Further if the C content is too high, Cr carbide is excessively generated, thus deteriorating weldability of an austenitic heat-resistant alloy material. Therefore, the C content is 0.030 to 0.120%. A lower limit of the C content is preferably 0.040%, and more preferably 0.050%. An upper limit of the C content is preferably 0.110%, and more preferably 0.100%.

Si: 0.02 to 1.00%

Silicon (Si), which is added as a deoxidizer during steel making, is also a necessary element to improve the oxidation resistance of an austenitic heat-resistant alloy material. This effect cannot be obtained if the Si content is too low. On the other hand, if the Si content is too high, hot workability of an austenitic heat-resistant alloy material deteriorates. Therefore, the Si content is 0.02 to 1.00%. A lower limit of the Si content is preferably 0.05%, and more preferably 0.10%. An upper limit of the Si content is preferably 0.80%, and more preferably 0.50%.

Mn: 0.10 to 2.00%

Manganese (Mn) combines with S, which is an impurity contained in an austenitic heat-resistant alloy material, to form a MnS, thereby improving hot workability. This effect cannot be obtained if the Mn content is too low. On the other hand, if the Mn content is too high, an austenitic heat-resistant alloy material is embrittled, rather deteriorating hot workability. Further if the Mn content is too high, weldability of the austenitic heat-resistant alloy material deteriorates. Therefore, the Mn content is 0.10 to 2.00%. A lower limit of the Mn content is preferably 0.20%, more preferably 0.30%, and further preferably 0.50%. An upper limit of the Mn content is preferably 1.80%, more preferably 1.50%, and further preferably 1.20%.

Cr: 20.0% or More to Less Than 28.0%

Chromium (Cr) is an important element for improving molten-salt corrosion resistance. Further, Cr improves the oxidation resistance of an austenitic heat-resistant alloy material. To ensure excellent molten-salt corrosion resistance in a molten salt of 400 to 600° C., a Cr content of not less than 20.0% is required. Conventionally, it is generally considered that corrosion resistance improves as the Cr content increases. However, if the Cr content is too high, a Cr oxide film mainly composed of Cr oxide is formed. Since the Cr oxide film dissolves into a molten salt, the molten-salt corrosion resistance of an austenitic heat-resistant alloy material deteriorates. Further, if the Cr content is too high, structural stability deteriorates, and creep strength of the austenitic heat-resistant alloy material decreases. Furthermore, if the Cr content is too high, weldability of the austenitic heat-resistant alloy material deteriorates. Therefore, the Cr content is 20.0% or more to less than 28.0%. A lower limit of the Cr content is preferably 20.5%, more preferably 21.0%, and further preferably 22.0%. An upper limit of the Cr content is preferably 27.5%, more preferably 26.5%, and further preferably 26.0%.

Ni: More Than 35.0% to 50.0% or Less

Nickel (Ni) is an element that stabilizes an austenitic structure, and is an important alloying element to ensure molten-salt corrosion resistance. To obtain a stable austenitic structure, a Ni content of more than 35.0% is required from the balance between itself and the Cr content described above. On the other hand, if the Ni content is too high, NiO is formed on $(Fe, Cr, Ni)_3O_4$ in a molten salt. In this case, the molten-salt corrosion resistance of an austenitic heat-resistant alloy material in a molten salt deteriorates. Further, if the Ni content is too high, increase in cost will result. Further, if the Ni content is too high, creep strength of an austenitic heat-resistant alloy material decreases. Therefore, the Ni content is more than 35.0% to 50.0% or less. A lower limit of the Ni content is preferably 38.5%, more preferably 40.0%, and further preferably 41.0%. An upper limit of the Ni content is preferably 48.0%, more preferably 47.0%, and further preferably 45.0%.

W: 4.0 to 10.0%

Tungsten (W) suppresses grain sliding creep, which occurs preferentially in a high-temperature region, by solid-solution strengthening effect. If the W content is too low, this effect cannot be obtained. On the other hand, if the W content is too high, since an austenitic heat-resistant alloy material is excessively hardened, hot workability of the austenitic heat-resistant alloy material deteriorates. Further if the W content is too high, weldability of the austenitic heat-resistant alloy material deteriorates. Therefore, the W content is 4.0 to 10.0%. A lower limit of the W content is preferably 4.5%, and more preferably 6.0%. An upper limit of the W content is preferably 9.0%, and more preferably 8.0%.

Ti: 0.01 to 0.30%

Titanium (Ti) precipitates as a carbonitride, thereby increasing the high temperature strength of an austenitic heat-resistant alloy material. If the Ti content is too low, this effect cannot be obtained. On the other hand, if the Ti content is too high, undissolved carbonitride and/or oxide is generated, thus the austenite grain is caused to have a mixed grain size. Further if the Ti content is too high, nonuniform creep deformation and deterioration of ductility are caused. Therefore, the Ti content is 0.01 to 0.30%. A lower limit of the Ti content is preferably 0.03%, and more preferably 0.05%. An upper limit of the Ti content is preferably 0.25%, and more preferably 0.20%.

Nb: 0.01 to 1.00%

Niobium (Nb) precipitates as carbonitride to increase the high temperature strength of an austenitic heat-resistant alloy material. If the Nb content is too low, this effect cannot be obtained. On the other hand, if the Nb content is too high, weldability of an austenitic heat-resistant alloy material deteriorates. Therefore, the Nb content is 0.01 to 1.00%. A lower limit of the Nb content is preferably 0.05%, and more preferably 0.10%. An upper limit of the Nb content is preferably 0.60%, and more preferably 0.50%.

Sol. Al: 0.0005 to 0.0400%

Aluminum (Al) is used as a deoxidizer. If the Al content is too low, this effect cannot be obtained. On the other hand, if a large amount of Al remains, structural stability of an austenitic heat-resistant alloy material deteriorates. Therefore, the Al content is 0.0005 to 0.0400%. A lower limit of the Al content is preferably 0.0010%, and more preferably 0.0050%. An upper limit of the Al content is preferably 0.0300%, and more preferably 0.0200%. In the present disclosure, the Al content refers to the content of acid-soluble Al (sol. Al).

B: 0.0005 to 0.0100%

Boron (B) suppresses oxides or nitrides by reducing the contents of N and O to be described later. If the B content is too low, this effect cannot be obtained. On the other hand, if the B content is too high, weldability of an austenitic heat-resistant alloy material deteriorates. Therefore, the B content is 0.0005 to 0.0100%. A lower limit of the B content is preferably 0.0007%, and more preferably 0.0010%. An upper limit of the B content is preferably 0.0080%, and more preferably 0.0050%.

The balance of the chemical composition of the base metal of an austenitic heat-resistant alloy material of the present disclosure consists of Fe and impurities. Here, the term "impurities" in the chemical composition of the base metal means what are introduced from ores and scraps as raw materials, or a production environment when industrially producing an austenitic heat-resistant alloy material, and what are permitted within a range not adversely affecting the austenitic heat-resistant alloy material of the present disclosure.

[Optional Elements]

The chemical composition of the base metal of an austenitic heat-resistant alloy material of the present disclosure may contain the following elements as optional elements.

Zr: 0 to 0.1000%

Zirconium (Zr) is an optional element and may not be contained. In other words, the Zr content may be 0%. If contained, Zr strengthens grain boundaries, thereby improving high temperature strength of an austenitic heat-resistant alloy material. This effect will be obtained if even a slight amount of Zr is contained. On the other hand, if the Zr content is too high, undissolved oxide and nitride are generated, similarly to the case of Ti, thus promoting grain sliding creep and non-uniform creep deformation. Further, if the Zr content is too high, creep strength and ductility in a high-temperature region of an austenitic heat-resistant alloy material deteriorate. Therefore, the Zr content is 0 to 0.1000%. A lower limit of the Zr content is preferably 0.0005%, and more preferably 0.0010%. An upper limit of the Zr content is preferably 0.0600%.

Ca: 0 to 0.0500%

Calcium (Ca) is an optional element and may not be contained. In other words, the Ca content may be 0%. If contained, Ca combines with S thereby stabilizing S, and improves hot workability of an austenitic heat-resistant alloy material. This effect will be obtained if even a slight amount of Ca is contained. On the other hand, if the Ca content is too high, toughness, ductility and steel quality of an austenitic heat-resistant alloy material deteriorate. Therefore, the Ca content is 0 to 0.0500%. A lower limit of the Ca content is preferably 0.0005%. An upper limit of the Ca content is preferably 0.0100%.

REM: 0 to 0.2000%

Rare earth metals (REM) are optional elements and may not be contained. In other words, the REM content may be 0%. If contained, REM form stable oxides and sulfides, thereby suppressing undesirable effects of O and S. If REM are contained, corrosion resistance, hot workability, creep strength and creep ductility of an austenitic heat-resistant alloy material will be improved. These effects will be obtained if even a slight amount of REM is contained. On the other hand, if the REM content is too high, inclusions such as oxides are excessively generated, and thereby hot workability and weldability of an austenitic heat-resistant alloy material deteriorate. Therefore, the REM content is 0 to 0.2000%. A lower limit of the REM content is preferably 0.0005%, and more preferably 0.0010%. An upper limit of the REM content is preferably 0.1000%. The REM in the present disclosure means 17 elements including elements from Lanthanum (La) of element number 57 to Lutetium (Lu) of element number 71 in the periodic table, added with Yttrium (Y) and Scandium (Sc). The REM content means a total content of these elements.

Hf: 0 to 0.2000%

Hafnium (Hf) is an optional element and may not be contained. In other words, the Hf content may be 0%. If contained, Hf forms stable oxides and sulfides, thereby suppressing undesirable effects of O and S. If Hf is contained, corrosion resistance, hot workability, creep strength and creep ductility of an austenitic heat-resistant alloy material will be improved. This effect will be obtained if even a slight amount of Hf is contained. On the other hand, if the Hf content is too high, inclusions such as oxides are excessively generated, thereby deteriorating hot workability and weldability of an austenitic heat-resistant alloy material. Therefore, the Hf content is 0 to 0.2000%. A lower limit of the Hf content is preferably 0.0005%, and more preferably 0.0010%. An upper limit of the Hf content is preferably 0.1000%.

Pd: 0 to 0.2000%

Palladium (Pd) is an optional element and may not be contained. In other words, the Pd content may be 0%. If contained, Pd forms stable oxides and sulfides, thereby suppressing undesirable effects of O and S. If Pd is contained, corrosion resistance, hot workability, creep strength and creep ductility of an austenitic heat-resistant alloy material will be improved. These effects will be obtained if even a slight amount of Pd is contained. On the other hand, if the Pd content is too high, inclusions such as oxides are excessively generated, thereby deteriorating hot workability and weldability of an austenitic heat-resistant alloy material. Therefore, the Pd content is 0 to 0.2000%. A lower limit of the Pd content is preferably 0.0005%, and more preferably 0.0010%. An upper limit of the Pd content is preferably 0.1000%.

The impurities include, for example, the following elements. The contents of these elements are limited from the following reasons.

P: 0.040% or Less

Phosphorus (P) is an impurity which is unavoidably contained. In other words, a lower limit of the P content is more than 0%. P deteriorates weldability and hot workability of an austenitic heat-resistant alloy material. Therefore, the P content is 0.040% or less. An upper limit of the P content is preferably 0.030%. The P content is preferably as low as possible. However, extreme reduction of the P content will significantly increase the production cost. Therefore, when taking into consideration of industrial production, a lower limit of the P content is preferably 0.0005%.

S: 0.010% or Less

Sulfur (S) is an impurity which is unavoidably contained. In other words, a lower limit of the S content is more than 0%. S deteriorates weldability and hot workability of an austenitic heat-resistant alloy material. Therefore, the S content is 0.010% or less. An upper limit of the S content is preferably 0.008%. The S content is preferably as low as possible. However, in a case in which a slight amount of S is contained to increase the fluidity during welding, 0.004% or more of S may be contained.

N: Less Than 0.020%

Nitrogen (N) is an impurity which is unavoidably contained. In other words, a lower limit of the N content is more than 0%. If the N content is too high, undissolved carbonitrides of Ti and B are generated, thereby causing the structure of an austenitic heat-resistant alloy material to have a mixed grain size. In this case, grain sliding creep and non-uniform creep deformation in a high-temperature region is promoted, thereby decreasing strength of an austenitic heat-resistant alloy material. Therefore, the N content is less than 0.020%. An upper limit of the N content is preferably 0.016%, and more preferably 0.010%. The N content is preferably as low as possible. However, extreme reduction of the N content will significantly increase the production cost. Therefore, when taking into consideration of industrial production, a lower limit of the N content is preferably 0.005%.

O: 0.0050% or Less

Oxygen (O) is an impurity which is unavoidably contained. In other words, a lower limit of the O content is more than 0%. If the O content is too high, undissolved oxides of Ti and Al are generated, thereby causing the structure of an austenitic heat-resistant alloy material to have a mixed grain size. In this case, grain sliding creep and non-uniform creep deformation in a high-temperature region are promoted, thus decreasing strength of an austenitic heat-resistant alloy material. Therefore, the O content is 0.0050% or less. An upper limit of the O content is preferably 0.0030%. The O content is preferably as low as possible. However, extreme reduction of the O content will significantly increase the production cost. Therefore, when taking into consideration of industrial production, a lower limit of the O content is preferably 0.0005%.

Mo: Less Than 0.5%

Molybdenum (Mo) is an impurity which is unavoidably contained. In other words, the lower limit of the Mo content is more than 0%. If the Mo content is too high, an austenitic heat-resistant alloy material is caused to produce an embrittled layer in a high-temperature environment. Further, if the Mo content is too high, corrosion resistance of an austenitic heat-resistant alloy material deteriorates. Therefore, the Mo content is less than 0.5%. An upper limit of the Mo content is preferably 0.3%, and more preferably 0.1%. The Mo content is preferably as low as possible. However, extreme reduction of the Mo content will significantly increase the production cost. Therefore, when taking into consideration of industrial production, a lower limit of the Mo content is preferably 0.01%.

Co: 0 to 0.80%

Cobalt (Co) is an impurity which may be mixed from scraps or the like. Co may not be contained. In other words, the Co content may be 0%. If the Co content is too high, hot workability of an austenitic heat-resistant alloy material deteriorates. Therefore, Co is not positively added. The Co content is 0 to 0.80%. If Co is contained, a lower limit of the Co content is more than 0%. However, in a case in which a slight amount of Co is contained to improve creep strength, not less than 0.01% of Co may be contained.

Cu: 0 to 0.50%

Copper (Cu) is an impurity which may be mixed from scraps or the like. Cu may not be contained. In other words, the Cu content may be 0%. If the Cu content is too high, grain boundary sliding creep in a high-temperature region will be promoted. Therefore, Cu is not positively added. The Cu content is 0 to 0.50%. If Cu is contained, a lower limit of the Cu content is more than 0%. An upper limit of the Cu content is preferably 0.20%. However, in a case in which a slight amount of Cu is contained to increase strength, not less than 0.01% of Cu may be contained.

[Microstructure of Base Metal and Shape of Austenitic Heat-Resistant Alloy Material]

The microstructure of the base metal of an austenitic heat-resistant alloy material of the present disclosure is an austenite single phase, excepting precipitates. The shape of the austenitic heat-resistant alloy material of the present disclosure will not be particularly limited. The shape of the austenitic heat-resistant alloy material may be any of a tube, a plate, a rod, a wire, and shape steel. The austenitic heat-resistant alloy material can be suitably used as a tube.

The austenitic heat-resistant alloy material further includes $Cr_2O_3$, $(Fe, Cr, Ni)_3O_4$, and $NaFeO_2$. The $Cr_2O_3$ is disposed on the surface of the base metal of the austenitic heat-resistant alloy material. The $(Fe, Cr, Ni)_3O_4$ is disposed on the $Cr_2O_3$. The $NaFeO_2$ is disposed on the $(Fe, Cr, Ni)_3O_4$. In other words, these oxides are stacked on the surface of the base metal of the austenitic heat-resistant alloy material in the order of $Cr_2O_3$, $(Fe, Cr, Ni)_3O_4$, and $NaFeO_2$ from the surface side of the base metal.

[$Cr_2O_3$]

$Cr_2O_3$ is formed on the surface of the base metal of an austenitic heat-resistant alloy material. The $Cr_2O_3$ suppresses outward diffusion of the components of the base metal of the austenitic heat-resistant alloy material. For this reason, formation of oxide scale is suppressed. Further, the $Cr_2O_3$ is formed between the base metal of the austenitic heat-resistant alloy material and $NaFeO_2$. The $NaFeO_2$ suppresses contact between the molten salt and the $Cr_2O_3$ without dissolving into a molten salt. For that reason, dissolution of $Cr_2O_3$ into the molten salt is suppressed. Since dissolution of $Cr_2O_3$ is suppressed, its effect is maintained. As a result, molten-salt corrosion resistance of the austenitic heat-resistant alloy material is improved.

[Identification of $Cr_2O_3$]

$Cr_2O_3$ on the surface of the base metal of the austenitic heat-resistant alloy material is identified by the following method. The austenitic heat-resistant alloy material is cut in the thickness direction of an oxide on the surface of the austenitic heat-resistant alloy material to take a sample including the oxides. A cross section of the oxides of the sample is analyzed by use of XRD (X-ray diffraction) and EPMA (Electron Probe Micro Analyzer).

XRD is measured under the following conditions.

Apparatus: RINT-2500 manufactured by Rigaku Corporation

X-ray tube: Co line

Incident light wavelength: 1.78897 angstrom

Scan range: 2θ=10 to 102°

Scan step: 0.02°

EPMA is measured under the following conditions.

Apparatus: Electron beam micro analyzer (JXA-8530F manufactured by JEOL Ltd.)

Measurement magnification: 5000 times

Acceleration voltage: 15.0 kV

Measurement method: Element mapping

Measurement range: 18 μm in the thickness direction of the oxide×18 μm in the direction perpendicular to the thickness of the oxide From analysis results by XRD, a peak of $Cr_2O_3$ is confirmed. Further, from Cr mapping analysis by EPMA, it is confirmed that a region, in which Cr concentration is higher than the Cr concentration of the base metal of the austenitic heat-resistant alloy material, exists in the oxides. This identifies that $Cr_2O_3$ is formed on the surface of the base metal of the austenitic heat-resistant alloy material.

[Thickness of $Cr_2O_3$]

A thickness of $Cr_2O_3$ is, for example, 0.3 to 3.5 μm. If the thickness of $Cr_2O_3$ is 0.3 μm or more, outward diffusion of the alloy components from the alloy, and inward diffusion of oxygen from the molten salt are stably suppressed, and the molten-salt corrosion resistance of the austenitic heat-resistant alloy material is further stably improved. A lower limit of the thickness of $Cr_2O_3$ is preferably 0.5 μm. An upper limit of the thickness of the Cr oxide is preferably 2.0 μm.

[Measurement Method of Thickness of $Cr_2O_3$]

The thickness of $Cr_2O_3$ is measured by the following method. A test specimen is sampled by cutting the austenitic heat-resistant alloy material in the thickness direction of the oxides on the surface of the base metal of the austenitic heat-resistant alloy material. Elemental mapping analysis by EPMA is performed on the cross section of oxides under the same conditions as in the above described identification method of $Cr_2O_3$. Within a range in which oxygen (O) is detected by the element mapping, the Cr concentration obtained by the element mapping is divided into three stages. The total area of the region having the highest Cr concentration (Cr-concentrated layer) among the three stages of Cr concentration is calculated. The total area of the Cr-concentrated layer obtained is divided by the length of the measurement range in the direction perpendicular to the thickness of the oxides. The obtained value is defined as the thickness of $Cr_2O_3$.

[(Fe, Cr, Ni)$_3O_4$]

(Fe, Cr, Ni)$_3O_4$ is disposed on the $Cr_2O_3$. The (Fe, Cr, Ni)$_3O_4$ suppresses the inward diffusion of molten salt components (Na ion and K ion) to the base metal side of the austenitic heat-resistant alloy material. For that reason, the molten-salt corrosion resistance of the austenitic heat-resistant alloy material will be improved.

[Identification Method of (Fe, Cr, Ni)$_3O_4$]

The (Fe, Cr, Ni)$_3O_4$ is identified by the following method. The austenitic heat-resistant alloy material is cut in the thickness direction of oxides on the surface of the austenitic heat-resistant alloy material to take a sample including the oxides. The cross section of the oxides of the sample is analyzed using XRD and EPMA under the same conditions as in the above described identification method of $Cr_2O_3$. As a result of the analysis, peaks of spinel phases (Fe—Cr spinel, Ni—Cr spinel, Fe—Ni spinel, and Fe—Cr—Ni spinel) are confirmed by XRD. Subsequently, it is confirmed that regions where Fe, Cr and Ni are detected overlap with each other within a range in which oxygen (O) is detected by element mapping. The Ni concentrations in the above described $Cr_2O_3$ and in $NaFeO_2$ to be described below are low. A region (Ni-concentrated layer) which is located between $Cr_2O_3$ (Cr-concentrated layer) and $NaFeO_2$, and in which the Ni concentration is higher than in $Cr_2O_3$ (Cr-concentrated layer) and in $NaFeO_2$ is determined. Thereby, (Fe, Cr, Ni)$_3O_4$ is identified, and further, it is identified that the (Fe, Cr, Ni)$_3O_4$ is disposed on the $Cr_2O_3$.

[Thickness of (Fe, Cr, Ni)$_3O_4$]

A thickness of (Fe, Cr, Ni)$_3O_4$ is, for example, 0.5 to 5.0 μm. When the thickness of the (Fe, Cr, Ni)$_3O_4$ is 0.5 μm or more, since inward diffusion of the Na ions, the K ions, and the like from a molten salt is stably suppressed, molten-salt corrosion resistance of the austenitic heat-resistant alloy material is further stably improved. A lower limit of the thickness of (Fe, Cr, Ni)$_3O_4$ is preferably 1.0 μm. An upper limit of the thickness of (Fe, Cr, Ni)$_3O_4$ is preferably 3.0 μm.

[Measurement Method of Thickness of (Fe, Cr, Ni)$_3O_4$]

As in the above described identification method of $Cr_2O_3$, EPMA analysis (element mapping) is performed on the cross section of oxides on the surface of the base metal of an austenitic heat-resistant alloy material. Within a range in which oxygen (O) is detected by elemental mapping, a region (Ni concentrated layer) which is located between $Cr_2O_3$ (Cr-concentrated layer) and $NaFeO_2$ and in which the Ni concentration is higher than in $Cr_2O_3$ (Cr-concentrated layer) and $NaFeO_2$ is determined. A total area of the Ni-concentrated layer within the measurement range is calculated. The total area of the Ni-concentrated layer obtained is divided by the length of the measurement range in the direction perpendicular to the thickness of the oxide. The obtained value is defined as the thickness of (Fe, Cr, Ni)$_3O_4$.

[$NaFeO_2$]

$NaFeO_2$ is formed on the (Fe, Cr, Ni)$_3O_4$. The $NaFeO_2$ hardly dissolves in a molten salt. For that reason, the $NaFeO_2$ suppresses contact between the $Cr_2O_3$ formed thereunder and the molten salt. The $NaFeO_2$ further suppresses contact between the base metal of an austenitic heat-resistant alloy material and the molten salt. Therefore, molten-salt corrosion resistance of the austenitic heat-resistant alloy material is improved.

[Identification Method of $NaFeO_2$]

Analyses by the XRD and EPMA are performed on the cross section of oxides on the surface of the base metal of the austenitic heat-resistant alloy material under the same conditions as in the above described identification method of $Cr_2O_3$. As a result of the analysis by XRD, a peak of $NaFeO_2$ is confirmed. Next, it is confirmed that regions where Fe and Na are detected overlap with each other within a range in which oxygen (O) is detected by element mapping. Thereby, $NaFeO_2$ is identified. Moreover, a depth of a region where Na is detected (position of the oxide in the depth direction) is confirmed. Thereby, it is identified that the $NaFeO_2$ is disposed on $(Fe, Cr, Ni)_3O_4$.

[Thickness of $NaFeO_2$]

A thickness of $NaFeO_2$ is, for example, 0.5 to 7.0 μm. When the thickness of $NaFeO_2$ is 0.5 μm or more, since the contact between the molten salt and the base metal of an austenitic heat-resistant alloy material is stably suppressed, molten-salt corrosion resistance of the austenitic heat-resistant alloy material is further stably improved. A lower limit of the thickness of $NaFeO_2$ is preferably 1.0 μm. An upper limit of the thickness of $NaFeO_2$ is preferably 5.0 μm.

[Measurement Method of Thickness of $NaFeO_2$]

As in the above described $Cr_2O_3$ identification method, EPMA analysis (element mapping) is performed on the cross section of oxides on the surface of the base metal of an austenitic heat-resistant alloy material. Within a range in which oxygen (O) is detected by elemental mapping, a region (Na-concentrated layer) where Na is detected is determined. A total area of the Na-concentrated layer within the measurement range is calculated. The total area of the Na-concentrated layer obtained is divided by the length of the measurement range in the direction perpendicular to the thickness of the oxides. The obtained value is defined as the thickness of $NaFeO_2$.

[Production Method]

An example of the method for producing an austenitic heat-resistant alloy material of the present disclosure will be described. The austenitic heat-resistant alloy material can be produced, for example, by bringing or immersing an austenitic heat resistant alloy including a Ni—Fe oxide having a spinel type structure on or above the surface of the above described base metal into contact with or in a molten salt of 500° C. or more. An upper limit of the temperature of the molten salt is, for example, 800° C. The molten salt is, for example, one or more kinds selected from the group consisting of a molten nitrate salt, a molten carbonate salt, a molten sulfate salt, and a molten chloride salt.

The nitrate salt is a salt having a nitrate ion as an anion. The nitrate salt is preferably a salt of a nitrate ion with one or more kinds selected from the group consisting of an alkali metal ion, an alkaline earth metal ion, and an ammonium ion. The nitrate salt is, for example, one or more kinds selected from the group consisting of lithium nitrate, sodium nitrate, potassium nitrate, calcium nitrate, ammonium nitrate, magnesium nitrate, and barium nitrate.

The carbonate salt is a salt having a carbonate ion as an anion. The carbonate is preferably a salt of a carbonate ion with one or more kinds selected from the group consisting of an alkali metal ion, an alkaline earth metal ion and an ammonium ion. The carbonate salt is, for example, one or more kinds selected from the group consisting of lithium carbonate, sodium carbonate, potassium carbonate, calcium carbonate, ammonium carbonate, magnesium carbonate, and barium carbonate.

The sulfate is a salt having a sulfate ion as an anion. The sulfate is preferably a salt of a sulfate ion with one or more kinds selected from the group consisting of an alkali metal ion, an alkaline earth metal ion and an ammonium ion. The sulfate salt is, for example, one or more kinds selected from the group consisting of lithium sulfate, sodium sulfate, potassium sulfate, calcium sulfate, ammonium sulfate, magnesium sulfate, and barium sulfate.

A chloride salt is a salt having a chloride ion as an anion. The chloride salt is preferably a salt of a chloride ion with one or more kinds selected from the group consisting of an alkali metal ion, an alkaline earth metal ion and an ammonium ion. The chloride salt is, for example, one or more kinds selected from the group consisting of lithium chloride, sodium chloride, potassium chloride, calcium chloride, ammonium chloride, magnesium chloride, and barium chloride.

The time for bringing or immersing the austenitic heat-resistant alloy into contact with or in the molten salt is, although not particularly limited as long as it s 50 hours or longer, preferably 100 hours or longer. The contact or immersion time may be, for example, 3000 hours.

By bringing or immersing an austenitic heat resistant alloy including a Ni—Fe oxide having a spinel type structure on or above the surface of a base metal into contact with or in a molten salt, $NaFeO_2$ having a high growth rate is formed with Ni—Fe oxide as a nucleus. Thereafter, $(Fe, Cr, Ni)_3O_4$ is formed between the $NaFeO_2$ and the base metal of the austenitic heat resistant alloy. Thereafter, $Cr_2O_3$ is further formed between the $(Fe, Cr, Ni)_3O_4$ and the base metal of the austenitic heat resistant alloy. Thereby, an austenitic heat-resistant alloy material can be produced.

Hereinafter, although the present disclosure will be described in more specifically by way of Examples, the present disclosure will not be limited to these Examples.

EXAMPLES

Austenitic heat resistant alloys having various chemical compositions of base metal, and compositions of film were produced to investigate molten-salt corrosion resistance in a molten salt.

[Investigation Method]

Starting materials of Alloy Nos. 1 to 16 having the chemical compositions shown in Table 1 were melted to produce ingots. Referring to Table 1, the alloys of Alloy Nos. 1 to 10 were within the range of the chemical composition of the base metal of the austenitic heat resistant alloy of the present disclosure. On the other hand, the alloys of Alloy Nos. 11 to 16 were outside of the range of the chemical composition of the base metal of the austenitic heat resistant alloy of the present disclosure. The alloy of Alloy No. 15 had a chemical composition corresponding to the known SUS347H. The alloy of Alloy No. 16 had a chemical composition corresponding to known Alloy 625.

TABLE 1

| | Chemical composition (mass %, the balance: Fe and impurities) | | | | | | | | | | | | | | | |
|---|---|---|---|---|---|---|---|---|---|---|---|---|---|---|---|---|
| Alloy No. | C | Si | Mn | P | S | Cr | Ni | W | Ti | Nb | sol. Al | B | N | O | Mo | Others |
| 1 | 0.080 | 0.23 | 1.07 | 0.011 | 0.006 | 22.5 | 40.6 | 10.0 | 0.02 | 0.02 | 0.002 | 0.0096 | 0.018 | 0.0023 | 0.19 | — |
| 2 | 0.062 | 0.57 | 0.36 | 0.024 | 0.002 | 25.1 | 41.4 | 7.6 | 0.13 | 0.30 | 0.019 | 0.0027 | 0.007 | 0.0025 | 0.32 | — |
| 3 | 0.076 | 0.11 | 0.52 | 0.005 | 0.002 | 23.5 | 44.2 | 6.8 | 0.11 | 0.25 | 0.010 | 0.0033 | 0.016 | 0.0017 | 0.09 | — |
| 4 | 0.101 | 0.75 | 1.42 | 0.003 | 0.003 | 24.7 | 43.2 | 8.8 | 0.03 | 0.06 | 0.009 | 0.0044 | 0.009 | 0.0034 | 0.17 | — |
| 5 | 0.078 | 0.32 | 1.03 | 0.001 | 0.001 | 24.9 | 39.1 | 7.9 | 0.09 | 0.38 | 0.016 | 0.0038 | 0.009 | 0.0036 | 0.31 | Nd: 0.07, Ce: 0.07 |
| 6 | 0.089 | 0.20 | 0.58 | 0.003 | 0.003 | 25.0 | 42.1 | 7.2 | 0.09 | 0.37 | 0.013 | 0.0063 | 0.015 | 0.0022 | 0.16 | Y: 0.05 |
| 7 | 0.075 | 0.15 | 1.45 | 0.021 | 0.005 | 23.5 | 45.6 | 7.9 | 0.01 | 0.22 | 0.015 | 0.0021 | 0.015 | 0.0034 | 0.01 | Zr: 0.06 |
| 8 | 0.068 | 0.31 | 1.51 | 0.010 | 0.004 | 23.4 | 45.1 | 8.0 | 0.05 | 0.23 | 0.012 | 0.0050 | 0.013 | 0.0035 | 0.05 | Ca: 0.01 |
| 9 | 0.074 | 0.21 | 1.02 | 0.009 | 0.006 | 22.5 | 47.1 | 7.1 | 0.06 | 0.41 | 0.011 | 0.0022 | 0.018 | 0.0026 | 0.11 | Hf: 0.02 |
| 10 | 0.098 | 0.12 | 1.10 | 0.008 | 0.006 | 20.5 | 48.3 | 6.9 | 0.07 | 0.45 | 0.021 | 0.0031 | 0.019 | 0.0041 | 0.12 | Pd: 0.01 |
| 11 | 0.088 | 0.11 | 1.32 | 0.008 | 0.005 | 30.1 | 44.2 | 6.7 | 0.05 | 0.15 | 0.015 | 0.0035 | 0.018 | 0.0038 | 0.21 | — |
| 12 | 0.087 | 0.13 | 1.51 | 0.006 | 0.001 | 18.2 | 43.2 | 7.2 | 0.01 | 0.16 | 0.013 | 0.0019 | 0.019 | 0.0023 | 0.30 | — |
| 13 | 0.091 | 0.15 | 1.48 | 0.005 | 0.002 | 23.5 | 54.1 | 8.2 | 0.03 | 0.21 | 0.015 | 0.0018 | 0.012 | 0.0025 | 0.15 | — |
| 14 | 0.093 | 0.14 | 1.46 | 0.004 | 0.002 | 23.6 | 9.5 | 9.1 | 0.07 | 0.22 | 0.015 | 0.0016 | 0.016 | 0.0017 | 0.16 | — |
| 15 | 0.067 | 0.37 | 1.20 | 0.002 | 0.002 | 17.9 | 12.8 | — | — | 0.67 | 0.022 | — | 0.058 | 0.0042 | 0.20 | — |
| 16 | 0.091 | 0.11 | 0.46 | 0.009 | 0.003 | 21.6 | 62.5 | — | 0.19 | 3.30 | 0.012 | — | 0.015 | 0.0018 | 8.70 | Co: 0.13 |

[Preparation Step]

The resulting ingot was heated to 1220° C., was formed into a plate material by hot forging, and thereafter was cooled to the room temperature. After cooling, the resulting plate material was formed into a plate material having a thickness of 20 mm by cutting the outer surface. The resulting plate material was then subjected to rolling at room temperature to be formed into a plate material having a thickness of 14 mm. Then, the resulting plate material was heated to 1200° C. and held for 15 minutes, and thereafter was cooled with water to produce an alloy plate.

[Pretreatment Step]

Alloy plates of Test Nos. 1 to 11 were immersed in a pretreatment solution (8 mass % of nitric acid, 3 mass % of hydrofluoric acid, 2.5 mass % of Fe ion concentration, and 0.4 mass % of Ni ion concentration) of 40° C. for 2 hours. An Alloy plate of Test No. 12 was immersed in a pretreatment solution (8 mass % of nitric acid, 3 mass % of hydrofluoric acid, 4.8 mass % of Fe ion concentration, and 0.9 mass % of Ni ion concentration) of 40° C. for 2 hours.

[Scale Removal Step]

The alloy plates of Test Nos. 1 to 12 were taken out from the pretreatment solution, and were washed with water. As a result of this, the oxide scale adhered to the surface of each alloy plate was removed.

[Ni—Fe Oxide Forming Step]

The alloy plates of Test Nos. 1 to 11 after water washing were immersed in a Ni—Fe oxide forming solution (10 mass % of nitric acid, 5 mass % of hydrofluoric acid, 0 mass % of Fe ion concentration, and 0.2 mass % of Ni ion concentration) of 30° C. for 2 hours. The alloy plate of Test No. 12 after water washing was immersed in a Ni—Fe oxide forming solution (10 mass % of nitric acid, 5 mass % of hydrofluoric acid, 2.4 mass % of Fe ion concentration, and 0.5 mass % of Ni ion concentration) of 30° C. for 2 hours. Through the steps described so far, austenitic heat resistant alloys of Test Nos. 1 to 12 were produced.

The alloy plates of Test Nos. 13 to 21 were subjected to normal pickling once. Specifically, pickling was performed for 10 minutes by using fluonitric acid (20 mass % of nitric acid and 1 mass % of hydrofluoric acid).

Oxides formed on the surface of the base metal of the alloy plate of each test number were analyzed. Thereafter, the alloy plate of each test number was subjected to a corrosion test in a molten salt.

[Analysis of Oxide]

Oxides formed on the surface of the base metal of the alloy plate of each test number were analyzed by the following method. A test specimen including oxides formed on the surface of the base metal of alloy plate was sampled from the alloy plate of each test number. A depth profile by XPS in the thickness direction of oxides was created for the surface of oxides. Regarding each element determined by the depth profile, state analysis was performed to separate the each element into an element existing as an oxide and an element existing as metal. It was confirmed that Ni, Fe, and Cr were included in elements existing as an oxide in a range from the surface of the oxides to a depth position at which the detection intensity of O (oxygen) became a half of the detection intensity of oxygen at the surface of the oxides. XPS was measured under the following conditions.

Apparatus: XPS measurement apparatus (ULVAC-PHI, Inc., Quantera SXM)

X-ray: mono-AlKα ray (hv=1486.6 eV), X ray diameter: 100 μmΦ

Neutralization gun: 1.0 V, 20 μA

Sputtering conditions: Ar$^+$, Acceleration voltage: 1 kV, Raster: 2×2 mm

Sputtering speed: 1.8 nm/min. ($SiO_2$ equivalent value).

Further, it was confirmed that peaks of Ni and Fe as an oxide were located at a position shallower than the peak of Cr as an oxide (position closer to the surface of oxides) from a depth profile of Test Nos. 2 to 11. Thereby, it was identified that the Cr oxide was present between the base metal of the alloy plate of each test number and the Ni—Fe oxide. Let two points, which were located in front and in the back of a peak position at which concentrations (at %) of Ni and Fe existing as an oxide were maximum, and at which the concentrations (at %) of Ni and Fe existing as an oxide were halves of their maximum values, be an A point and a B point, respectively. A distance in the depth direction between the A point and the B point was measured and assumed to be the thickness of the Ni—Fe oxide. Further, let two points, which were located in front and in the back of a peak position at which concentration (at %) of Cr existing as an oxide was maximum, and at which the concentration (at %) of Cr is a half of its maximum value, be a C point and a D point, respectively. A distance in the depth direction between the C point and the D point was measured and assumed to be the thickness of the Cr oxide. The results are shown in Table 2.

Next, the Raman spectroscopy was performed on oxides on the surface of the base metal of the alloy plate of each test number. From the chart obtained by the Raman spectroscopy, a peak of 700 to 710 cm$^{-1}$, which is peculiar to an oxide having a spinel type structure, was identified. Thereby, the Ni—Fe oxide on or above the surface of the base metal of the austenitic heat resistant alloy was identified. From the chart obtained by the Raman spectroscopy, a peak of around 550 cm$^{-1}$, which is peculiar to $Cr_2O_3$, was identified. Thereby, the Cr oxide was identified.

The Raman spectroscopy was performed under the following conditions.

Apparatus: microscopic laser Raman spectrometry apparatus (LabRAM HR Evolution, manufactured by HORIBA Ltd.)

Measurement arrangement: 180° back scattering arrangement

Excitation wavelength: 532 nm

Diffraction grating ruled line: 600 lines/mm

ND Filter: 25%

Power: 2.3 mW

Object lens: magnification of 50 times

[Molten Salt Corrosion Test]

Molten-salt corrosion resistance in a molten salt of the alloy plate of each test number was evaluated by the following test. A test specimen of a thickness of 1.5 mm×a width of 15 mm×a length of 25 mm was cut out from each of the alloy plates of Test Nos. 1 to 12 after the Ni—Fe oxide forming step, and each of the alloy plates of Test Nos. 13 to 21 after pickling. After being polished on one test specimen surface with waterproof abrasive paper, the test specimen was degreased and dried to be used in the test. The molten salt was prepared by mixing $NaNO_3$ and $KNO_3$ at a weight ratio of 60:40 and heating the mixture to 600° C. The test specimen was immersed in the molten salt at a test temperature of 600° C. The test time was 3000 hours.

Oxides formed on the surface of each test specimen after the test was analyzed by X-ray diffraction (XRD) and Electron Probe Micro Analyzer (EPMA), and the structure of the oxides was identified by the above described method. The results are shown in Table 2.

XRD was measured under the following conditions.

Apparatus: RINT-2500 manufactured by Rigaku Corporation.

X-ray tube: Co line

Incident light wavelength: 1.78897 angstrom

Scan range: 2θ=10 to 102°

Scan step: 0.02°

EPMA was measured under the following conditions.

Apparatus: Electron beam micro analyzer (JXA-8530F manufactured by JEOL Ltd.)

Measurement magnification: 5000 times

Acceleration voltage: 15.0 kV

Measurement method: Element mapping

Measurement range: 18 μm in the thickness direction of the oxide×18 μm in the direction perpendicular to the thickness of the oxide Moreover, oxide scale formed on the surface was removed after the test. A corrosion weight loss (mg/cm$^2$) was calculated from the difference between the weight of a steel plate before the test and the weight of the steel plate after the test was finished and the oxide scale was removed. The results are shown in Table 2.

[Thickness Measurement Test of Each Oxide]

EPMA analysis (element mapping) was performed on the cross section of oxides on the surface of the alloy plate of each test number after the molten salt corrosion test under the same conditions as in the above described analysis of oxides. Thicknesses of $Cr_2O_3$, $(Fe, Cr, Ni)_3O_4$, and $NaFeO_2$ were measured from the concentration of each element by the above described method. The results are shown in Table 2.

TABLE 2

| | | | Oxides | |
| --- | --- | --- | --- | --- |
| Test No. | Alloy No. | Treatment conditions | Structure | Thickness (nm) |
| 1 | 5 | Pretreatment + Scale removal + Ni—Fe oxide formation | $(Ni, Fe, Cr)_3O_4$ | $NiFeCrO_4$: 4.5 |
| 2 | 1 | Pretreatment + Scale removal + Ni—Fe oxide formation | $NiFe_2O_4$/ $Cr_2O_3$ | $NiFe_2O_4$: 2.8 $Cr_2O_3$: 8.5 |
| 3 | 2 | Pretreatment + Scale removal + Ni—Fe oxide formation | $(Ni, Fe, Cr)_3O_4$/ $Cr_2O_3$ | $NiFeCrO_4$: 4.3 $Cr_2O_3$: 6.9 |
| 4 | 3 | Pretreatment + Scale removal + Ni—Fe oxide formation | $NiFe_2O_4$/ $Cr_2O_3$ | $NiFe_2O_4$: 4.2 $Cr_2O_3$: 7.5 |
| 5 | 4 | Pretreatment + Scale removal + Ni—Fe oxide formation | $NiFe_2O_4$/ $Cr_2O_3$ | $NiFe_2O_4$: 3.1 $Cr_2O_3$: 9.2 |
| 6 | 5 | Pretreatment + Scale removal + Ni—Fe oxide formation | $NiFe_2O_4$/ $Cr_2O_3$ | $NiFe_2O_4$: 2.9 $Cr_2O_3$: 8.6 |
| 7 | 6 | Pretreatment + Scale removal + Ni—Fe oxide formation | $(Ni, Fe, Cr)_3O_4$/ $Cr_2O_3$ | $NiFeCrO_4$: 4.1 $Cr_2O_3$: 6.5 |
| 8 | 7 | Pretreatment + Scale removal + Ni—Fe oxide formation | $NiFe_2O_4$/ $Cr_2O_3$ | $NiFe_2O_4$: 2.9 $Cr_2O_3$: 9.0 |
| 9 | 8 | Pretreatment + Scale removal + Ni—Fe oxide formation | $NiFe_2O_4$/ $Cr_2O_3$ | $NiFeCrO_4$: 4.0 $Cr_2O_3$: 6.9 |
| 10 | 9 | Pretreatment + Scale removal + Ni—Fe oxide formation | $NiFe_2O_4$/ $Cr_2O_3$ | $NiFe_2O_4$: 3.0 $Cr_2O_3$: 8.1 |
| 11 | 10 | Pretreatment + Scale removal + Ni—Fe oxide formation | $NiFe_2O_4$/ $Cr_2O_3$ | $NiFe_2O_4$: 3.4 $Cr_2O_3$: 9.2 |
| 12 | 2 | Pretreatment + Scale removal + Ni—Fe oxide formation | $Cr_2O_3$ | — |
| 13 | 3 | Pickling | $Cr_2O_3$ | — |
| 14 | 4 | Pickling | $Cr_2O_3$ | — |
| 15 | 6 | Pickling | $Cr_2O_3$ | — |
| 16 | 11 | Pickling | $Fe_3O_4$ | — |
| 17 | 12 | Pickling | $Cr_2O_3$ | — |

TABLE 2-continued

| | | | | |
|---|---|---|---|---|
| 18 | 13 | Pickling | $Fe_3O_4$ | — |
| 19 | 14 | Pickling | $Cr_2O_3$ | — |
| 20 | 15 | Pickling | $Fe_3O_4$ | — |
| 21 | 16 | Pickling | $Cr_2O_3$ | — |

| Test No. | Test result Corrosion weight loss (mg/cm$^2$) | Oxides after corrosion test | Thickness (μm) |
|---|---|---|---|
| 1 | 5.5 | $NaFeO_2$/ (Fe, Cr, Ni)$_3O_4$/ $Cr_2O_3$ | $NaFeO_2$: 5.0/ (Fe, Cr, Ni)$_3O_4$: 2.0/ $Cr_2O_3$: 1.2 |
| 2 | 4.3 | $NaFeO_2$/ (Fe, Cr, Ni)$_3O_4$/ $Cr_2O_3$ | $NaFeO_2$: 2.5/ (Fe, Cr, Ni)$_3O_4$: 3.0/ $Cr_2O_3$: 2.4 |
| 3 | 3.2 | $NaFeO_2$/ (Fe, Cr, Ni)$_3O_4$/ $Cr_2O_3$ | $NaFeO_2$: 3.2/ (Fe, Cr, Ni)$_3O_4$: 3.5/ $Cr_2O_3$: 2.6 |
| 4 | 3.6 | $NaFeO_2$/ (Fe, Cr, Ni)$_3O_4$/ $Cr_2O_3$ | $NaFeO_2$: 2.8/ (Fe, Cr, Ni)$_3O_4$: 3.2/ $Cr_2O_3$: 2.2 |
| 5 | 3.8 | $NaFeO_2$/ (Fe, Cr, Ni)$_3O_4$/ $Cr_2O_3$ | $NaFeO_2$: 2.8/ (Fe, Cr, Ni)$_3O_4$: 3.0/ $Cr_2O_3$: 2.6 |
| 6 | 4.0 | $NaFeO_2$/ (Fe, Cr, Ni)$_3O_4$/ $Cr_2O_3$ | $NaFeO_2$: 2.6/ (Fe, Cr, Ni)$_3O_4$: 3.2/ $Cr_2O_3$: 2.6 |
| 7 | 3.4 | $NaFeO_2$/ (Fe, Cr, Ni)$_3O_4$/ $Cr_2O_3$ | $NaFeO_2$: 3.2/ (Fe, Cr, Ni)$_3O_4$: 3.5/ $Cr_2O_3$: 2.8 |
| 8 | 3.7 | $NaFeO_2$/ (Fe, Cr, Ni)$_3O_4$/ $Cr_2O_3$ | $NaFeO_2$: 3.0/ (Fe, Cr, Ni)$_3O_4$: 3.5/ $Cr_2O_3$: 2.8 |
| 9 | 3.3 | $NaFeO_2$/ (Fe, Cr, Ni)$_3O_4$/ $Cr_2O_3$ | $NaFeO_2$: 2.2/ (Fe, Cr, Ni)$_3O_4$: 2.6/ $Cr_2O_3$: 2.2 |
| 10 | 4.1 | $NaFeO_2$/ (Fe, Cr, Ni)$_3O_4$/ $Cr_2O_3$ | $NaFeO_2$: 3.0/ (Fe, Cr, Ni)$_3O_4$: 2.8/ $Cr_2O_3$: 2.5 |
| 11 | 3.9 | $NaFeO_2$/ (Fe, Cr, Ni)$_3O_4$/ $Cr_2O_3$ | $NaFeO_2$: 3.2/ (Fe, Cr, Ni)$_3O_4$: 3.2/ $Cr_2O_3$: 2.6 |
| 12 | 10.2 | (Cr, Ni)$_3O_4$/ $Cr_2O_3$ | — |
| 13 | 10.8 | (Cr, Ni)$_3O_4$/ $Cr_2O_3$ | — |
| 14 | 15.1 | (Cr, Ni)$_3O_4$/ $Cr_2O_3$ | — |
| 15 | 14.8 | (Cr, Ni)$_3O_4$/ $Cr_2O_3$ | — |
| 16 | 12.1 | $NiO$/$Cr_2O_3$ | — |
| 17 | 9.6 | $Fe_3O_4$/ $Cr_2O_3$ | — |
| 18 | 14.6 | $NiO$/$Cr_2O_3$ | — |
| 19 | 9.9 | $Fe_3O_4$/ $Cr_2O_3$ | — |
| 20 | 8.2 | $Fe_3O_4$/ $Cr_2O_3$ | — |
| 21 | 12.4 | $NiO$/ $Cr_2O_3$ | — |

[Test Results]

The test results are shown in Table 2. The chemical composition of the base metal of each alloy plate of Test Nos. 1 to 11 was appropriate. Alloy plates of Test Nos. 1 to 11 each further included the Ni—Fe oxide having a spinel type structure on or above the surface of the base metal. For that reason, the corrosion weight loss of each of the alloy plates of Test Nos. 1 to 11 was 8.0 mg/cm$^2$ or less, thus exhibiting excellent molten-salt corrosion resistance. The Ni—Fe oxide of each alloy plate of Test Nos. 2, 4 to 6, and 8 to 11 included $NiFe_2O_4$.

Alloy plates of Test Nos. 2 to 11 further included the Cr oxide between the base metal and the Ni—Fe oxide. For that reason, they exhibited further excellent molten-salt corrosion resistance, compared with the alloy plate of Test No. 1.

Specifically, the corrosion weight loss of each alloy plate of Test Nos. 2 to 11 was 4.4 mg/cm$^2$ or less. The Cr oxide of each alloy plate of Test Nos. 2 to 11 included $Cr_2O_3$.

Further, in each alloy plate of Test Nos. 1 to 11, the film structure after the molten salt corrosion test was appropriate. Specifically, $Cr_2O_3$, (Fe, Cr, Ni)$_3O_4$, and $NaFeO_2$ were included in this order from the base metal side on the surface of the base metal of each alloy plate after the molten salt corrosion test.

On the other hand, in the alloy plate of Test No. 12, although the chemical composition of the base metal was appropriate, the Fe ion concentration and the Ni ion concentration in the pretreatment solution and the Ni—Fe oxide forming solution were too high. For that reason, the alloy plate of Test No. 12 did not include the Ni—Fe oxide having a spinel type structure on or above the surface of the base metal. As a result, the corrosion weight loss of the alloy plate of Test No. 12 was 10.2 mg/cm$^2$, thus not exhibiting excellent molten-salt corrosion resistance.

In each alloy plate of Test Nos. 13 to 15, although the chemical composition of the base metal was appropriate, normal pickling was performed only once. For that reason, each alloy plate of Test Nos. 13 to 15 did not include the Ni—Fe oxide having a spinel type structure on or above the surface of the base metal. As a result, the corrosion weight loss of each alloy plate of Test Nos. 13 to 15 was more than 8.0 mg/cm$^2$, thus not exhibiting excellent molten-salt corrosion resistance.

In each alloy plate of Test Nos. 16 to 21, the chemical composition of the base metal was not appropriate. As a result, the corrosion weight loss of each alloy plate of Test Nos. 16 to 21 was more than 8.0 mg/cm$^2$, thus not exhibiting excellent molten-salt corrosion resistance.

So far, the embodiment of the present disclosure has been described. However, the above described embodiment is merely exemplification for carrying out the present disclosure. Accordingly, the present disclosure will not be limited to the above described embodiment, and can be carried out by appropriately modifying the above described embodiment within a range that does not deviate from the gist of the present invention.

The invention claimed is:

1. An austenitic heat resistant alloy, comprising:
a base metal having a chemical composition consisting of, in mass%,
C: 0.030 to 0.120%,
Si: 0.02 to 1.00%,
Mn: 0.10 to 2.00%,
Cr: 20.0% or more to less than 28.0%,
Ni: more than 35.0% to 50.0% or less,
W: 4.0 to 10.0%,
Ti: 0.01 to 0.30%,
Nb: 0.01 to 1.00%,
sol. Al: 0.0005 to 0.0400%,
B: 0.0005 to 0.0100%,
Zr: 0 to 0.1000%,
Ca: 0 to 0.0500%,
REM: 0 to 0.2000%,
Hf: 0 to 0.2000%,
Pd: 0 to 0.2000%,
P: 0.040% or less,
S: 0.010% or less,
N: less than 0.020%,
O: 0.0050% or less,
Mo: less than 0.5%,
Co: 0 to 0.80%, and
Cu: 0 to 0.50%,
with the balance being Fe and impurities; and
a Ni—Fe oxide having a spinel structure, on or above a surface of the base metal.

2. The austenitic heat resistant alloy according to claim 1, wherein the Ni—Fe oxide having the spinel structure includes NiFe$_2$O$_4$.

3. The austenitic heat resistant alloy according to claim 1, further comprising:
a Cr oxide between the base metal and the Ni—Fe oxide.

4. The austenitic heat resistant alloy according to claim 2, further comprising:
a Cr oxide between the base metal and the Ni—Fe oxide.

5. The austenitic heat resistant alloy according to claim 3, wherein the Cr oxide includes one or more kinds selected from the group consisting of Cr$_2$O$_3$ and Cr$_2$O$_3$.yH$_2$O,
where, y is any rational number.

6. The austenitic heat resistant alloy according to claim 4, wherein the Cr oxide includes one or more kinds selected from the group consisting of Cr$_2$O$_3$ and Cr$_2$O$_3$.yH$_2$O,
where, y is any rational number.

7. The austenitic heat resistant alloy according to claim 1, wherein the chemical composition of the base metal contains, in mass %,
Zr: 0.0005 to 0.1000%.

8. The austenitic heat resistant alloy according to claim 1, wherein the chemical composition of the base metal contains, in mass %,
Ca: 0.0005 to 0.0500%.

9. The austenitic heat resistant alloy according to claim 1, wherein the chemical composition of the base metal contains at least one kind selected from the group consisting of, in mass %,
REM: 0.0005 to 0.2000%, Hf: 0.0005 to 0.2000%, and Pd: 0.0005 to 0.2000%.

10. A method for producing an austenitic heat resistant alloy according to claim 1, comprising the steps of:
preparing a starting material having the chemical composition consisting of, in mass %,
C: 0.030 to 0.120%,
Si: 0.02 to 1.00%,
Mn: 0.10 to 2.00%,
Cr: 20.0% or more to less than 28.0%,
Ni: more than 35.0% to 50.0% or less,
W: 4.0 to 10.0%,
Ti: 0.01 to 0.30%,
Nb: 0.01 to 1.00%,
sol. Al: 0.0005 to 0.0400%,
B: 0.0005 to 0.0100%,
Zr: 0 to 0.1000%,
Ca: 0 to 0.0500%,
REM: 0 to 0.2000%,
Hf: 0 to 0.2000%,
Pd: 0 to 0.2000%,
P: 0.040% or less,
S: 0.010% or less,
N: less than 0.020%,
O: 0.0050% or less,
Mo: less than 0.5%,
Co: 0 to 0.80%, and
Cu: 0 to 0.50%,
with the balance being Fe and impurities;
pretreating the starting material by immersing the starting material in a solution containing nitric acid and hydrofluoric acid;
removing oxide scale on a surface of the starting material after taking out the starting material from the solution; and
forming a Ni—Fe oxide having a spinel structure on or above the surface of the starting material by immersing the starting material after removal of the oxide scale on the surface, in a solution which contains nitric acid and hydrofluoric acid and in which the concentration of the nitric acid is higher than the concentration of the hydrofluoric acid.

\* \* \* \* \*